United States Patent
Jewett et al.

(10) Patent No.: US 12,474,093 B1
(45) Date of Patent: Nov. 18, 2025

(54) STIRLING DEVICE

(71) Applicant: Sencera Energy, Inc., Charlotte, NC (US)

(72) Inventors: Russell Jewett, Lake Wylie, SC (US); Steven Pugh, Charlotte, NC (US)

(73) Assignee: SENCERA ENERGY, INC., Charlotte, NC (US)

( * ) Notice: Subject to any disclaimer, the term of this patent is extended or adjusted under 35 U.S.C. 154(b) by 0 days.

(21) Appl. No.: 19/217,888

(22) Filed: May 23, 2025

(51) Int. Cl.
*F25B 9/14* (2006.01)

(52) U.S. Cl.
CPC ..................... *F25B 9/14* (2013.01)

(58) Field of Classification Search
CPC ....................................................... F25B 9/14
See application file for complete search history.

(56) References Cited

U.S. PATENT DOCUMENTS

| | | |
|---|---|---|
| 2,102,196 A | 12/1937 | Henry |
| 2,105,019 A | 1/1938 | Kestell |
| 2,424,532 A | 7/1947 | Beard |
| 3,359,810 A | 12/1967 | Hansen |
| 4,329,915 A | 5/1982 | Schulz |
| 4,631,922 A | 12/1986 | Kleinwachter et al. |
| 4,801,249 A | 1/1989 | Kakizawa et al. |
| 5,630,351 A | 5/1997 | Clucas |
| 6,119,537 A | 9/2000 | Jost |
| 6,637,312 B1 | 10/2003 | Clucas et al. |
| 8,511,276 B2 * | 8/2013 | Omori ............... F01C 1/073 123/241 |
| 8,820,068 B2 * | 9/2014 | Dadd ............... F02G 1/0435 60/520 |

(Continued)

FOREIGN PATENT DOCUMENTS

| | | |
|---|---|---|
| CN | 106594211 A | 4/2017 |
| CN | 106917733 A | 7/2017 |

(Continued)

OTHER PUBLICATIONS

Werdich et al. (2013). Stirling-Maschinen. Oekobuch Vlg. + Versand; 13., vollständig überarbeitete Auflage 2013 (REV). (Jul. 8, 2013). (excerpt from book).

(Continued)

*Primary Examiner* — Filip Zec
(74) *Attorney, Agent, or Firm* — FINNEGAN, HENDERSON, FARABOW, GARRETT & DUNNER, LLP

(57) ABSTRACT

A Stirling device is disclosed. The Stirling device comprises a shaft, a motor configured to rotate the shaft about an axis, two working chambers, two coolant portions, and a regenerator portion. Each working chamber comprises a rotor rotating about the axis, connected to the shaft, and having a center offset from the axis; a slider coupled to the rotor; a first mover configured to move in a first direction perpendicular to the first axis based on a movement of the slider; and a second mover configured to move in a second direction perpendicular to the first axis and different from the second direction based on the movement of the slider. Both coolant portions are located between the two working chambers and each comprises an inlet port and an outlet port. The regenerator portion is located between the two coolant portions.

19 Claims, 12 Drawing Sheets

(56) References Cited

U.S. PATENT DOCUMENTS

| | | | |
|---|---|---|---|
| 9,228,489 B2* | 1/2016 | Domit | F01C 1/077 |
| 9,546,654 B2* | 1/2017 | Rabhi | F16H 39/04 |
| 9,797,340 B2* | 10/2017 | Kamen | F02G 1/0445 |
| 10,760,826 B2* | 9/2020 | Ning | F04B 39/0016 |
| 11,428,156 B2* | 8/2022 | Stanetsky | F01C 1/073 |
| 11,536,353 B1 | 12/2022 | Jewett | |
| 12,078,123 B2* | 9/2024 | Kamen | F16C 9/04 |
| 12,085,152 B2 | 9/2024 | Jewett | |
| 2003/0037627 A1 | 2/2003 | Green | |
| 2007/0199391 A1 | 8/2007 | Fourqurean | |
| 2010/0058923 A1 | 3/2010 | Green | |
| 2010/0132354 A1 | 6/2010 | Fanner et al. | |
| 2013/0341934 A1* | 12/2013 | Kawanishi | F03D 9/007 290/55 |
| 2016/0290340 A1* | 10/2016 | Maurino | F04D 29/042 |
| 2017/0051952 A1* | 2/2017 | Morie | F25B 9/14 |
| 2017/0241451 A1 | 8/2017 | Jewett et al. | |
| 2017/0343249 A1* | 11/2017 | Yamada | F25B 9/002 |
| 2018/0195502 A1* | 7/2018 | Ahn | F04B 39/02 |
| 2018/0358881 A1* | 12/2018 | Hull | F01B 1/06 |
| 2019/0186354 A1 | 6/2019 | Hofbauer et al. | |
| 2019/0277542 A1* | 9/2019 | Xu | F25B 9/14 |
| 2019/0316574 A1* | 10/2019 | Xu | F04B 35/008 |
| 2020/0064030 A1* | 2/2020 | Ning | F04B 7/04 |
| 2022/0220922 A1* | 7/2022 | Hofbauer | F25B 30/02 |

FOREIGN PATENT DOCUMENTS

| | | |
|---|---|---|
| CN | 106917734 A | 7/2017 |
| CN | 106949214 A | 7/2017 |
| CN | 107387697 A | 11/2017 |
| DE | 2606874 A1 | 9/1977 |
| FR | 3068444 B1 | 10/2019 |
| JP | S5837370 A | 3/1983 |
| WO | 2009157787 A1 | 12/2009 |

OTHER PUBLICATIONS

Organ, Allan J. 2013. Stirling Cycle Engines. John Wiley & Sons.

Werdich et al. (2013). Stirling-Maschinen. Oekobuch Vlg. + Versand; 13., vollständig überarbeitete Auflage 2013 (REV). (Jul. 8, 2013). (excerpt from book: pp. 39-46).

* cited by examiner

STIRLING DEVICE

TECHNICAL FIELD

The present disclosure generally relates to Stirling devices. More particularly, and without limitation, the present disclosure relates to innovations in heat pumps that utilize the Stirling cycle.

BACKGROUND

Some systems may generate heat as a product or byproduct of their operation. These systems may need to transfer the generated heat to maintain expected operation. Certain applications may require a heat pump to remove or add heat to a system. All these systems use refrigerants. However, refrigerants can typically have a very high Global Warming Potential (GWP), be toxic, be flammable, and leak into the outside environment. For example, some common refrigerants include R-12 refrigerant (e.g., FREON™), R-22 refrigerant, R-410 refrigerant, and R-32 refrigerant. Some of the examples may be banned for production or use due to extreme negative impact on the global environment or safety.

Further, heat pumps typically utilize the Vapor Compression Cycle or Rankine Cycle as the thermodynamic basis for operation. However, these heat cycles have lower efficiency compared to other heat cycles.

Moreover, heat pumps have a temperature range limited by a refrigerant used. Refrigerants used must change from liquid to gas at specific temperature and pressure conditions, which significantly narrows the effective operational temperature range of the heat pump system. Some heat pump systems attempt to remedy this problem by having multiple heat pump stages. However, multistage heat pumps may be large or bulky; may have decreased efficiency compared to a single stage heat pump due, for example, loss of heat energy between stages; and may be costly.

The present inventors have recognized a need for alternatives to using heat pumps in some apparatuses and systems. Furthermore, the present inventors have made one or more discoveries which may overcome one or more deficiencies associated with the use of heat pumps for one or more applications.

BRIEF SUMMARY

Embodiments of the present disclosure may relate to a Stirling device. In some embodiments, a Stirling device may comprise: a shaft; a motor configured to rotate the shaft about an axis; a first working chamber and a second working chamber; a first coolant portion and a second coolant portion; and a regenerator portion located between the first coolant portion and the second coolant portion. Further, each working chamber may comprise: a rotor rotating about the axis, the rotor connected to the shaft and having a center offset from the axis; a slider coupled to the rotor; a first mover coupled to the slider and configured to move in a first direction perpendicular to the axis based on a movement of the slider; and a second mover coupled to the slider and configured to move in a second direction perpendicular to the axis and different from the second direction based on the movement of the slider. Moreover, each coolant portion may be located between the first working chamber and the second working chamber and may comprise: an inlet port and an outlet port.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims. For example, embodiments of the present disclosure include a Stirling device configured to provide a highly efficient and more environmentally friendly heat transfer using the Stirling cycle. Non-limiting examples of applications for the Stirling device include heat pumps (e.g., for heating and cooling), engines, and generators.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of certain disclosed embodiments as set forth in the accompanying claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

Similar reference numerals may refer to similar parts throughout the several views of the drawings unless otherwise clearly represented.

DETAILED DESCRIPTION

Figure 1:
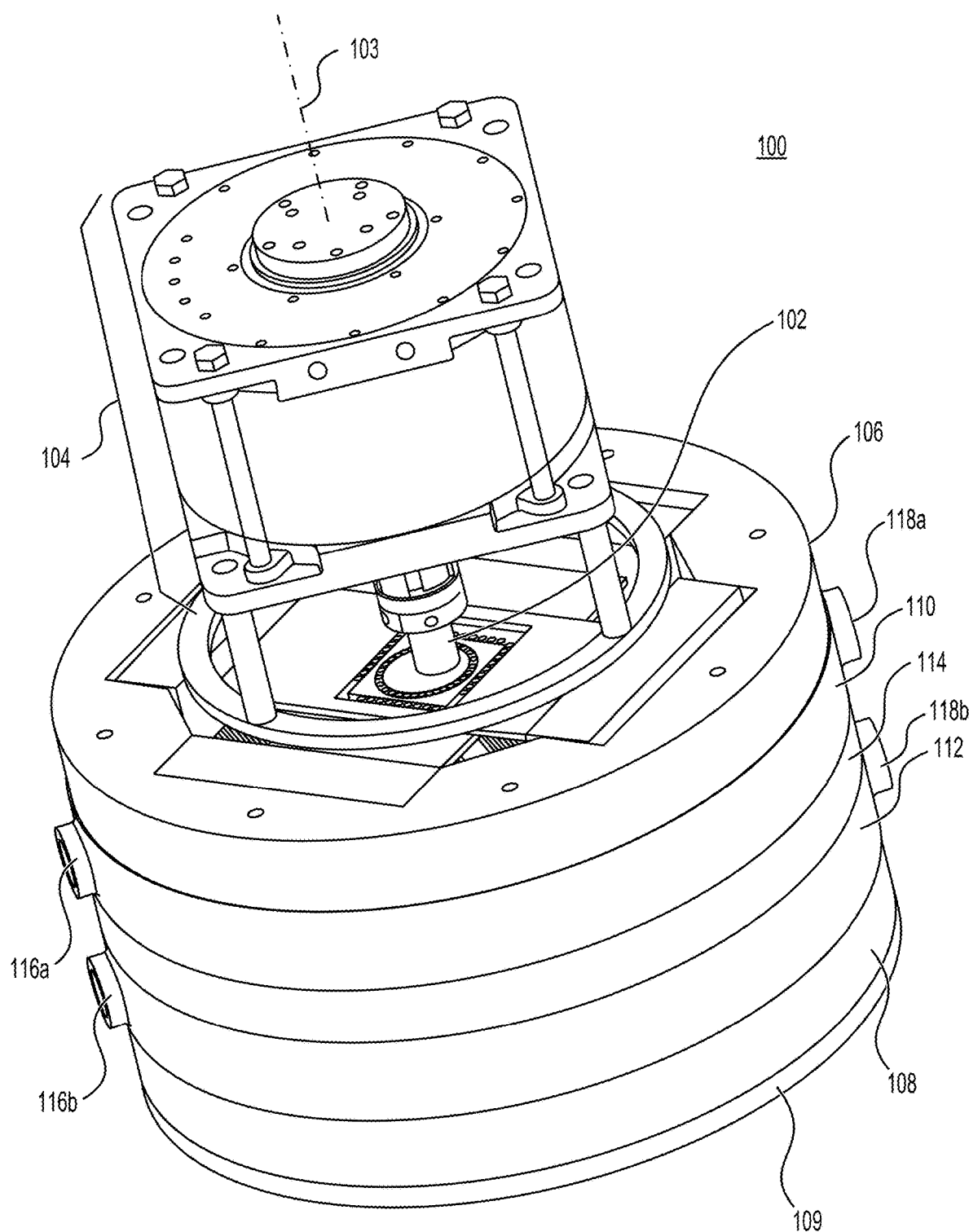
FIG. 1 illustrates an example heat pump, consistent with disclosed embodiments.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used unless otherwise explicitly defined. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, a Stirling cycle may refer to a thermodynamic cycle in which a working fluid (e.g., gas, liquid) is: heated at a higher temperature to expand and to do work on a piston while maintaining a constant temperature; transferred to a cooler space in which it loses heat at a constant volume; compressed at a lower temperature to reject heat to an environment; and transferred to the hot region to absorb heat at a constant volume.

As used herein, a Stirling device may refer to a device, system, or component configured to operate based on a Stirling cycle to convert heat energy into mechanical work or vice versa. In one example, a Stirling device may include an alpha type Stirling device including a rejector region, a regenerator region, an absorber region, a first piston section associated with the rejector region, and a second piston section associated with the absorber region.

By way of non-limiting example, a Stirling device may include a heat pump configured to convert mechanical work into a transfer of heat using the Stirling cycle. As used herein, a heat pump may refer to a device, system, or component configured to transfer heat from a first location, medium, or source to a second location, medium, or destination. For example, a heat pump for a building may be configured to cool or heat an area (e.g., room) by facilitating a transfer of heat from a hotter source to a colder sink. In some embodiments, a heat pump may be configured to heat or to cool coolant. As used herein, coolant may refer to a substance, typically a liquid or gas, that is configured to absorb and transfer heat. For example, coolant may include water, ethylene glycol, propylene glycol, air, nitrogen, any combination of the foregoing, or any other suitable substance for transferring and absorbing heat.

In another example, a Stirling device may include a Stirling engine. A Stirling engine may refer to a type of heat engine that operates using the expansion and compression of a working fluid (e.g., air, helium, or hydrogen) in a sealed system to convert heat energy into mechanical work through heating and cooling of the working fluid.

In yet another example, a Stirling device may include a Stirling generator. A Stirling generator may refer to a type of generator that operates using expansion and compression of a working fluid (e.g., air, helium, hydrogen) in a sealed system to convert heat energy into electrical energy (e.g., via mechanical work to drive a generator) through heating and cooling of the working fluid. For example, a Stirling device may drive or rotate a shaft connected to a magnet and coil generator via, for example, a shaft, a belt, or gears, such that the rotating shaft causes the magnets to spin inside wire coils, thereby inducing an electric current.

In some embodiments, a Stirling device may include or use a working fluid. As used herein, a working fluid may refer to a substance configured to transfer energy within a system. For example, a working fluid may include a fluid (e.g., liquid, gas) configured to transfer heat energy within a system by undergoing changes in temperature, pressure, and/or volume. In one example, a working fluid may be configured to absorb heat from a hot source. Further, a working fluid may be configured to release heat to a cold sink. By way of non-limiting example, a working fluid may include helium, hydrogen, air, nitrogen, or any other suitable working fluid for a Stirling device.

FIG. 1 illustrates an example Stirling device 100, consistent with disclosed embodiments.

In some embodiments, Stirling device 100 may comprise a shaft. As used herein, a shaft may refer to an elongated component configured to rotate to transmit power, motion, or torque in a system. For example, a shaft may be a cylindrical component configured to be rotated by a motor or to rotate a generator.

In some embodiments, Stirling device 100 may comprise a motor 104. As used herein, a motor may refer to a device or component configured to convert energy into motion. For example, a motor may be configured to convert electrical, hydraulic, pneumatic, or any other suitable form of energy into mechanical motion, including rotational motion. In one example, motor 104 may be a 10 KW motor. In another example, motor 104 may be a 15 KW motor. In some embodiments, motor 104 may be configured to rotate shaft 102 about an axis 103. For example, motor 104 and shaft 102 may be connected or coupled together such that when the motor is on and operational, the shaft rotates in a first direction about a central or longitudinal of the shaft (e.g., along a height of the shaft). A central or longitudinal axis may refer to an axis that passes through a center of an object and extends in a direction along a longest dimension or a height of the object. For example, a central axis of a cylinder may include an axis that extends through the center of both circle faces and a volumetric center of the cylinder (e.g., at a midpoint of its height). By way of non-limiting example, motor 104 may be coupled or connected to shaft 102 and may be configured to rotate shaft 102 in a first direction (e.g., clockwise, counterclockwise) about axis 103 defined as colinear with the central or longitudinal axis of the shaft.

In some embodiments, Stirling device 100 may comprise a generator. For example, the generator may include a magnet and coil system. A magnet and coil generator may refer to an electric energy generator configured to induce electric energy using a moving (e.g., rotating, moving linearly) magnet near coils (e.g., comprising copper). For example, Stirling device 100 may be configured to rotate shaft 102, using the Stirling cycle, such that rotating shaft 102 causes magnets (e.g., connected to shaft 102) to rotate near the coils, which induces an electric current.

In some embodiments, a motor or generator may be connected to a shaft using a vibration damping mechanism.

A vibration damping mechanism may refer to a component, element, or device configured to reduce or absorb vibrations. For example, a vibration damping mechanism may isolate or cushion a connection between a motor and a shaft to reduce transmissions of vibrations from the motor to the shaft and vice versa. In this way, damage to the motor or the generator or the shaft may be prevented, noise may be reduced, and/or lifespan of the device may be increased.

In some embodiments, Stirling device 100 may comprise a working chamber. As used herein, a working chamber may refer to a portion or component of a device or system that is configured to maintain a substantially same position or to be substantially stationary. For example, working chambers 106 and 108 may include a stationary housing or component configured to interact with a moving component or rotating component. In some embodiments, working chambers 106 and 108 may comprise a rotor, a slider, and one or more movers, as further described and exemplified with respect to FIGS. 2A-2H.

In some embodiments, working chambers 106 and 108 may be configured to house or to enclose a fluid. For example, working chambers 106 and 108 may be configured to prevent an internal working fluid from escaping the device or system, as further described and exemplified below with respect to FIG. 3. In some embodiments, a working chamber may be sealed by a cover plate. For example, as depicted in FIG. 1, a cover plate configured to seal first working chamber 106 is hidden and a cover plate 109 configured to seal second working chamber 108 is shown. In this way, a cover plate may prevent a fluid (e.g., working fluid of a Stirling device) from leaking or escaping outside a device.

In some embodiments, as shown in FIG. 1, Stirling device 100 may comprise two working chambers 106 and 108 positioned on opposite sides of Stirling device 100. For example, working chambers 106 and 108 may be positioned such that coolant portions 110 and 112 and a regenerator portion 114 are positioned between working chamber 106 and working chamber 108. By way of non-limiting example, working chambers 106 and 108 may be configured to take in and to discharge a working fluid such that the working fluid may flow between working chambers 106 and 108 in a cyclic manner, including, for example, using one or more heat exchangers (not shown in FIG. 1).

In some embodiments, Stirling device 100 may comprise first coolant portion 110 and second coolant portion 112. As used herein a coolant portion may refer to a portion or component of a device or system that is configured to receive, to discharge, to facilitate a flow of, or to contain a fluid (e.g., gas, liquid). In some embodiments, first coolant portion 110 may have an inlet port 116a and an outlet port 118a, and second coolant portion 112 may have an inlet port 116b and an outlet port 118b. As used herein, an inlet port may refer to a component, element, or opening configured to permit a flow of fluid into a system, device, or region. As used herein, an outlet port may refer to a component, element, or opening configured to permit a flow of fluid out of a system, device, or region.

In some embodiments, coolant may flow through first coolant portion 110 via inlet port 116a and outlet port 118a. For example, inlet port 116a of first coolant portion 110 may be configured to provide an opening through which coolant may flow into first coolant portion 110. Further, outlet port 118a of first coolant portion 110 may be configured to provide an opening through which coolant may flow out of the coolant portion. Similarly, coolant may be configured to flow into second coolant portion 112 via inlet port 116b and out of second coolant portion 112 via outlet port 118b. In general, it may be understood that an inlet port and an outlet port may be similar elements defined or characterized by a direction of flow through them, and, depending on an application or system, may fulfill interchangeable roles (i.e., inlet port acting as an outlet port or vice versa).

In some embodiments, a coolant portion may be located between a plurality of working chambers. In the example embodiment as shown in FIG. 1, Stirling device 100 may comprise first coolant portion 110 and second coolant portion 112, each positioned or located between first working chamber 106 and second working chamber 108.

In some embodiments, Stirling device 100 may be configured to facilitate a transfer of heat between a coolant flowing through a coolant portion and an internal working fluid. For example, Stirling device 100 may include one or more channels configured to provide a flow path for an internal working fluid between working chambers 106 and 108. In some embodiments, the channel may be a flow path defined by heat exchangers. For example, a hotter working fluid flowing through first coolant portion 110 inside a heat exchanger may reject heat to a colder coolant (e.g., via thermally conductive heat exchanger). Further, a colder working fluid flowing through second coolant portion 112 may absorb heat from a hotter coolant (e.g., via thermally conductive heat exchanger).

In some embodiments, Stirling device 100 may comprise a regenerator portion 114. As used herein, a regenerator portion may refer to a portion or component of a device or system that is configured to receive, to discharge, to facilitate a transfer of heat, or to store heat. For example, a regenerator portion may be configured to facilitate a transfer of heat from a hotter working fluid to a colder heat storage medium. Further, a regenerator portion may be configured to facilitate a transfer of heat from a hotter heat storage medium to a colder working fluid. In some embodiments, regenerator portion 114 may comprise a heat exchange medium. A heat exchange medium may refer to a material or substance configured to facilitate a transfer of heat between two substances, systems, or environments and/or to store received heat. For example, a heat exchange medium may comprise a thermally conductive material having a higher heat capacity relative to the working fluid. By way of non-limiting example, regenerator portion 114 may comprise a heat exchange medium comprising a solid piece of stainless steel, tungsten, polypropylene, or any other suitable thermally conductive material with a high heat capacity relative to a working fluid.

Figure 2A:
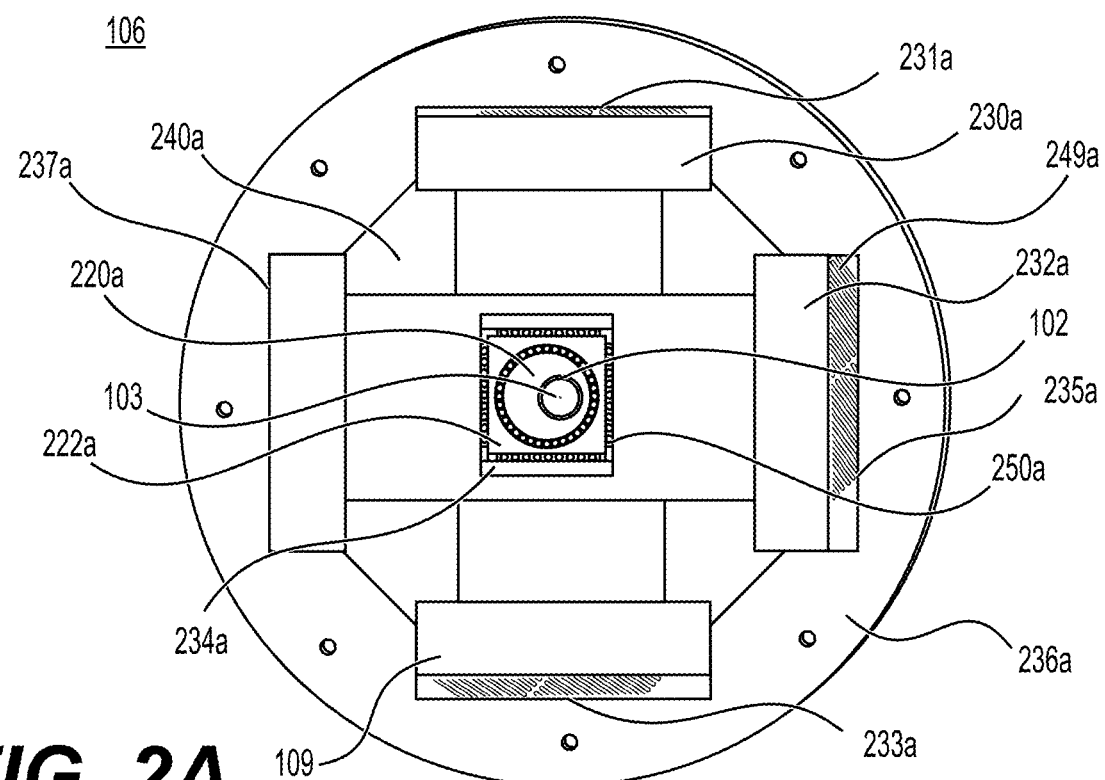
FIG. 2A illustrates a plan view of one example working chamber of the heat pump depicted in FIG. 1 with a plenum layer, consistent with disclosed embodiments.
Figure 2B:
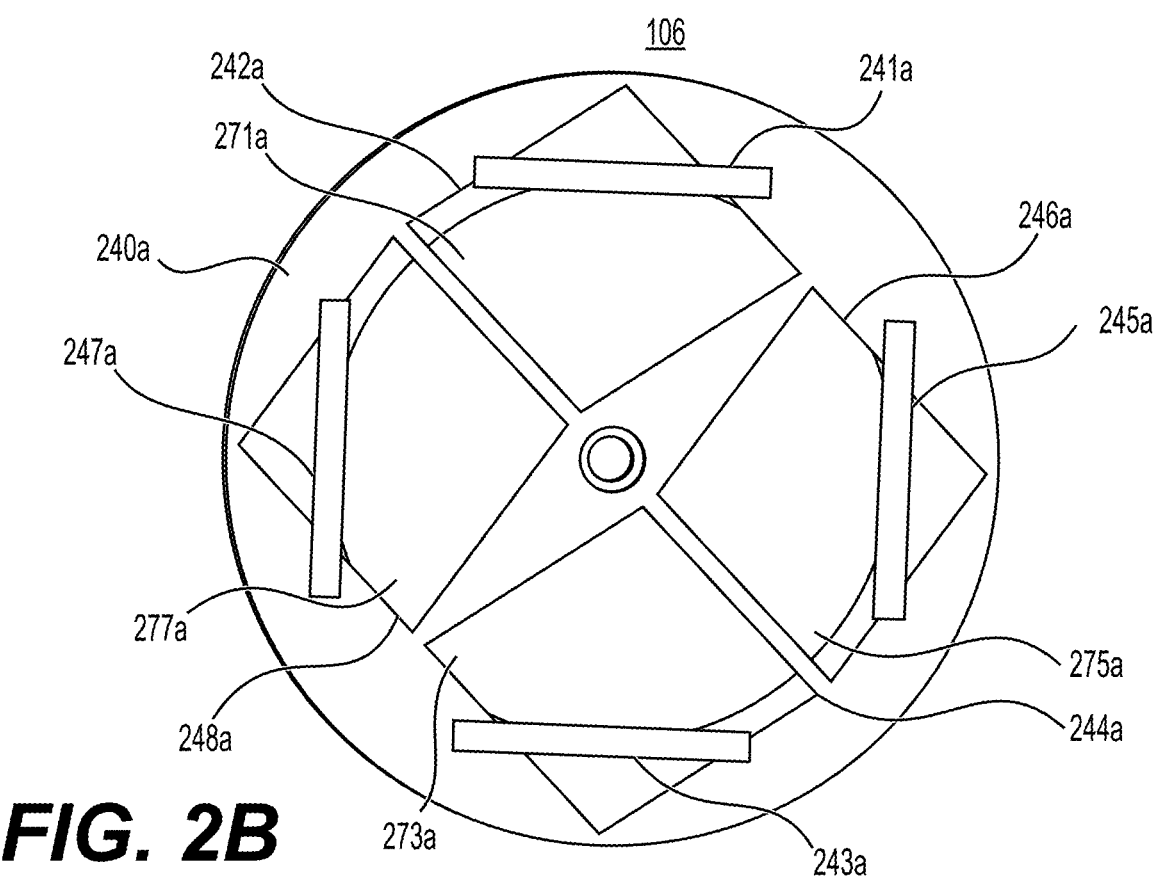
FIG. 2B illustrates a bottom view of the plenum layer depicted in FIG. 2A, consistent with disclosed embodiments.

FIG. 2A illustrates a top plan view of first working chamber 106 of Stirling device 100, and FIG. 2B illustrates a bottom view of a plenum layer 240a, consistent with disclosed embodiments. As depicted in FIGS. 2A and 2B, first working chamber 106 may comprise first mover 230a; second mover 232a; shaft 102 centered about axis 103; a rotor 220a; a slider 222a; a housing 236a with recesses 231a, 233a, 235a, and 237a; couplings 250a; a plenum layer 240a with openings 241a, 243a, 245a, and 247a and plenums 242a, 244a, 246a, and 248a; and slots 249a. Although not depicted, second working chamber 108 may be understood to comprise same or similar components as first working chamber 106 (e.g., as depicted in FIGS. 3B, 3D, 3F, 3H). Further, it may be understood that same or similar components and processes as described with reference to first working chamber 106 may similarly apply to second working chamber 108.

In some embodiments, a working chamber may comprise a mover. As used herein, a mover may refer to a component or element configured to generate motion or force in a device or system. For example, a mover may be configured to move in response to a motor. By way of non-limiting example, first working chamber 106 may comprise first mover 230a and second mover 232a, and second working chamber 108 may comprise first mover 230b and second mover 232b.

In some embodiments, a working chamber may comprise two movers that are phase-shifted from each other. For example, first working chamber 106 may comprise first mover 230a that is phase-shifted from second mover 232a. In one example, first mover 230a is phase-shifted from second mover 232a by 90 degrees. Further, in one example in which working chambers 106 and 108 each comprise 3 movers, each mover may be phase-shifted from another mover by 60 degrees. In general, an amount of phase shift between movers may be equal and may include a quotient of 360 degrees divided by twice the number of movers.

In some embodiments, a working chamber may comprise a housing. For example, a housing may be configured to have one or more recesses configured to receive a mover. By way of non-limiting example, housing 236a may include recesses 231a and 233a configured to receive an end of first mover 230a and may include recesses 235a and 237a to receive an end of second mover 232a.

In some embodiments, a mover may be configured to act as a pressure wave generator. As used herein, a pressure wave generator may refer to an element or a component of a device or system configured to respond to a pressure change of a fluid by moving. For example, a pressure wave generator in a Stirling device may be configured to convert pressure fluctuations or changes in a working fluid into mechanical motion. By way of non-limiting example, first mover 230a and/or second mover 232a may be configured to act as a pressure wave generator.

In some embodiments, a mover may be configured to act as a displacer. As used herein, a displace may refer to an element or a component of a device or system configured to move a fluid from one region to another. In one example, working chamber 106 and working chamber 108 may be in fluid connection with each other via one or more hollow heat exchangers through which working fluid may flow, as further described and exemplified with respect to FIG. 4. For example, a displacer in a Stirling device may be configured to move (e.g., based on a rotational torque provided by a motor) within a working chamber to shift or displace a working fluid (e.g., gas, liquid) from first working chamber 106 to second working chamber 108 and vice versa. By way of non-limiting example, first mover 230a and/or second mover 232a may be configured to act as a displacer by— based at least in part on a rotational torque provided by motor 104 that is converted into linear motion via shaft 102, rotor 220a, slider 222a, and a corresponding opening 234a of the mover—moving back and forth in first working chamber 106.

In some embodiments, a mover may be associated with one or more recesses of housing 236a. For example, first mover 230a may be associated with recesses 231a and 233a and second mover 232a may be associated with recesses 235a and 237a. In this example embodiment, as movers 230a and 232a move back and forth between their respective recesses, the ends of movers 230a and 232a and the respective recesses (i.e., 231a, 233a, 235a, and 237a) may effectively form four piston-cylinder assemblies. Further, each pair of piston-cylinder assemblies on both ends of a same mover (i.e., 230a or 232a) may have opposite phases (i.e., 180 degrees apart).

In some embodiments, plenum layer 240a may be configured to facilitate a flow of fluid from the effective piston cylinder assembly into slots 249a. Plenum layer 240a may include a number of openings (i.e., 241a, 243a, 245a, or 247a) corresponding to the number of recesses (i.e., 231a, 233a, 235a, or 247a) in housing 236a. For example, plenum layer 240a may include an opening 241a corresponding to and fluidly connecting recess 231a, an opening 243a corresponding to and fluidly connecting recess 233a, an opening 245a corresponding to and fluidly connecting recess 235a, and an opening 247a corresponding to and fluidly connecting recess 237a. As a mover moves into and out of a corresponding recess, the mover facilitates a flow of fluid through the corresponding opening into and/or out of a portion of plenum layer 240a.

Further, each opening of plenum layer 240a may be fluidly connected to a plenum (i.e., 242a, 244a, 246a, or 248a). Each plenum may include a sloped surface (i.e., 271a, 273a, 275a, or 277a) to facilitate a flow of fluid from the recess to a set of slots 249a. For example, opening 241a may correspond to plenum 242a, opening 243a may correspond to plenum 244a, opening 245a may correspond to plenum 246a, and opening 247a may correspond to plenum 248a. In this way, a mover moving into a respective recess (i.e., 231a, 233a, 235a, or 237a) may displace and funnel a fluid through a corresponding opening (i.e., 241a, 243a, 245a, or 247a) into a plenum (i.e., a corresponding quadrant of plenum layer 240a), which further guides the fluid into a set of slots 249a (e.g., via a corresponding sloped surface).

Figure 2C:
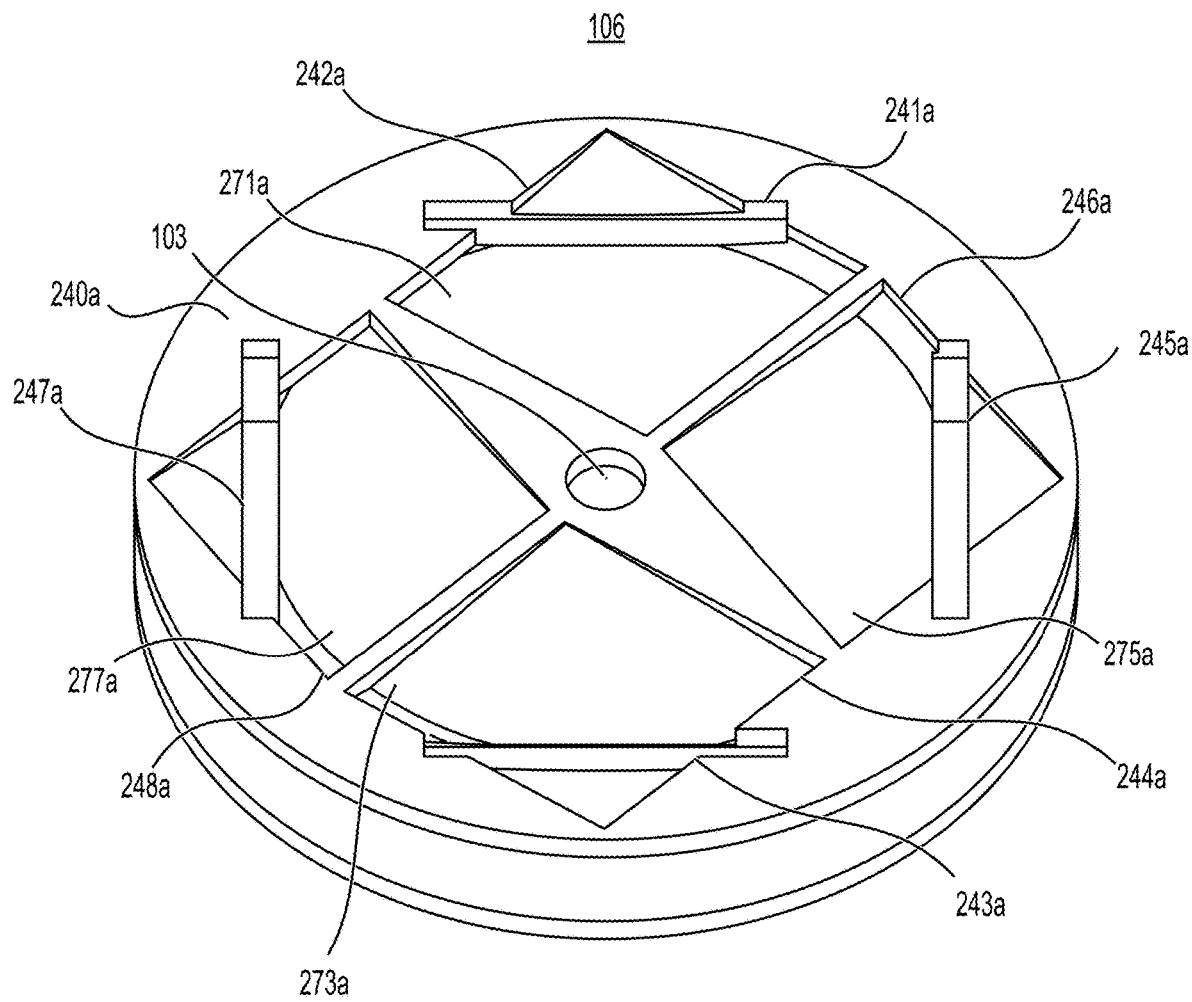
FIG. 2C illustrates an isometric view of the plenum layer depicted in FIG. 2B.

For example, as depicted in the isometric view of FIG. 2C, each of sloped surfaces 271a, 273a, 275a, and 277a are sloped such that the portion of the sloped surface nearest its corresponding opening is lowest and the corners nearest to and farthest from axis 103 (e.g., a center of plenum layer 240a) is highest. In this way, a sloped surface may deflect or facilitate a flow of fluid flowing in a direction towards first working chamber 106 towards and through its corresponding opening to the corresponding recess. Then when the mover moves into its corresponding recess, the mover may displace and funnel the fluid into the corresponding plenum and through a set of slots 249a towards second working chamber 108.

In some embodiments, a mover may include an uneven surface. An uneven surface or patterned surface may refer to a surface having a texture, structure, or geometric design. For example, an uneven surface may include a rough surface or a surface having grooves. In one example, a surface of a mover that contacts a housing may be uneven. By way of non-limiting example, the surface of first mover 230a that is configured to contact housing 236a in recess 231a or 233a may be uneven. In one example, the uneven surface may include grooves may have a depth of 50 microns. In another example, the uneven surface may be rough. The surface may be roughened by an abrasive technique (e.g., sanding, grinding, wire brushing), a chemical or electrochemical technique (e.g., acid etching, anodizing, electrochemical etching), surface blasting (e.g., sandblasting, shot peening, water jetting), thermal or laser techniques (e.g., plasma or flame spraying, laser etching), manufacturing techniques (e.g., forming mover with a rough surface), or any other suitable technique or method for roughening a surface. A mover having an uneven surface may trap, between the uneven surface and the recess, some working fluid. This trapped gas may have an increased pressure (e.g., by having a reduced volume) such that some lifting or pushing force is generated or supplied by the trapped gas to push the mover away from the recess.

In some embodiments, a working chamber may comprise couplings 250a. As used herein, a coupling may refer to a component or set of components configured to couple a first device, element, or component and a second device, element, or component. For example, couplings 250a may be configured to couple two components together and facilitate a synchronized or smooth movement and/or energy transfer between the two components. In one example, a coupling may include ball bearings. By way of non-limiting example, couplings 250a may be positioned between rotor 220a and slider 222a to facilitate a smooth, low-resistance motion between the two. In other examples, a coupling may include roller bearings, needle bearings, fluid couplings (e.g., oil or any appropriate other viscous substance), magnetic couplings, or any other suitable means of coupling components together.

Further, couplings 250a may be positioned between slider 222a and first mover 230a and/or second mover 232a to facilitate a smooth, low-resistance motion between the two.

In some embodiments, couplings 250a may be sealed in a structure. For example, a cover plate or structure may enclose or encase couplings to substantially prevent any flow of a substance from inside the structure with the coupling to leak outside the structure. In this way, grease or lubricant can be used with the couplings (e.g., ball bearings) to decrease friction further without impacting or affecting the working fluid.

In some embodiments, a mover of one working chamber and a corresponding mover of another working chamber may be configured to have an adjustable phase-shift. For example, the phase angle between first mover 230a of first working chamber 106 and first mover 230b of second working chamber 108 may be adjustable by an actuator or by moving or adjusting a position of a component. In some embodiments, a working chamber may comprise a shaft coupler. A shaft coupler may refer to a component or device configured to couple two shafts. For example, a shaft coupler may have a spiral groove along an axis of a shaft dividing the shaft into two shafts such that a position of the shaft coupler may be adjusted. In one example, a shaft coupler may be configured such that, based on a position of the shaft coupler, a first shaft or portion of a single shaft driving a displacer of a Stirling device has a variable phase offset relative to a second shaft or another portion of the single shaft driving a pressure wave generator of a Stirling device.

In some embodiments, a working chamber may comprise slider 222a. As used herein, a slider may refer to a component configured to move along a predetermined path and may be guided by rails, tracks, or other constraints. For example, a slider may include a plate (i.e., a flat, thin, and/or rigid component). Slider 222a may be configured to facilitate a translation of rotational movement of shaft 102 to a linear, repetitive movement of movers 230a and 232a. In some embodiments, slider 222a may be a Scotch yoke plate. A Scotch yoke plate may refer to a plate configured to move in a linear, reciprocating motion in response to a coupled rotating element.

In some embodiments, a mover may be coupled to slider 222a by couplings 250a. By way of non-limiting example, second mover 232a may be coupled to slider 222a by couplings 250a in opening 234a such that slider 222a may move in a linear direction along the length of second mover 232a. In some embodiments, the opening of the mover may be configured to facilitate a movement of a slider. By way of non-limiting example, second mover 232a may have an opening 234a, and slider 222a may be coupled to first mover 230a in an opening (not depicted) via intervening couplings 250a. Further, opening 234a may provide a path for slider 222a to move within second mover 232a. Additionally, first mover 230a may have an opening (not depicted) and slider 222a may be coupled to first mover 230a via intervening couplings 250a. As slider 222a moves within an opening of a mover, slider 222a may push or move the mover in a same direction. In some other embodiments, second mover 232a may be coupled to slider 222a by contact without additional components, including with or without lubrication.

In some embodiments, slider 222a may be coupled to rotor 220a by couplings 250a. For example, a slider may be coupled to a rotor with intervening couplings such that when the rotor rotates, the slider moves. By way of non-limiting example, slider 222a may be coupled to rotor 220a via couplings 250a such that when rotor 220a rotates, slider 222a may move in a linear direction defined as starting from the axis of rotation and passing through the center of rotor 220a and towards the outside of Stirling device 100. Further, the linear movement of slider 222a may be defined or restricted by an opening of the mover. For example, as shaft 102 rotates rotor 220a, slider 222a may be moved, as assisted or facilitated by couplings 250a, in a linear manner as defined by a path provided by opening 234a of second mover 232a. First mover 230a may similarly have an opening configured to provide a linear movement path for slider 222a. As slider 222a moves within an opening and against an end of the opening, slider 222a may push or move a corresponding mover. For example and with reference to FIG. 2A, as slider 222a moves toward and against a top edge of opening 234a, first mover 230a may be pushed or moved in a same direction toward and into recess 231a. In this example embodiment, slider 222a may act as a Scotch-yoke plate.

In some embodiments, slider 222a may be shaped as a regular polygon having a number of sides equal to twice the number of movers. In one example with two movers, a slider may include a flat, square-shaped component. In other examples with a same or different number of movers (e.g., 1, 2, 3, 4, etc.), a slider may include a rectangular, hexagonal, octagonal, or any other suitably shaped component.

In some embodiments, a working chamber may comprise rotor 220a. As used herein, a rotor may refer to a component or element of a device or system configured to rotate. For example, a rotor may include an element configured to rotate by a motor or a component intermediately connected or coupled between the rotor and the motor. In one example, a rotor may be circular shaped. In other examples, a rotor may have a different shape (e.g., elliptical, rectangular).

In some embodiments, rotor 220a may be connected or coupled to a shaft. For example, rotor 220a may have an opening through which shaft 102 is inserted and connected or affixed to rotor 220a such that when shaft 102 rotates about axis 103, rotor 220a also rotates about axis 103. By way of non-limiting example, rotor 220a may be connected to shaft 102 such that a center of shaft 102 is offset from a center of rotor 220a. In some embodiments, rotor 220a may be configured to rotate about a central axis of shaft 102 in a same direction as shaft 102 such that rotor 220a may rotate in an asymmetric manner. In some embodiments, the amount of offset between the center of rotor 220a and axis 103 may correspond to a distance of movement for a mover. For example, a larger offset may result in a longer linear movement for movers 230a and 232a.

In some embodiments, a working chamber may comprise one or more components or elements comprising a material having a lower thermal conductivity or high thermal resistivity. For example, one or more of first mover 230a, second mover 232a, housing 236a, slider 222a, rotor 220a, and shaft 102 may comprise a material having a low thermal conductivity. In this way, the components of a working chamber do not By way of non-limiting example, examples of such materials may include ceramics (e.g., silicon nitride, alumina), polymers (e.g., polyether ether ketone), composite materials (e.g., fiberglass), metals or metal alloys (e.g., titanium, titanium alloy, Inconel, Hastelloy, tungsten, stainless steel), or any other suitable material with a lower thermal conductivity (e.g., less than 100 W/(m·K), less than 30 W/(m·K)). In some embodiments, each component of a working chamber may comprise a material with a lower thermal conductivity. By way of non-limiting example, second working chamber 108 may comprise rotor 220b, slider 222b, first mover 230b, and second mover 232b, each of which comprises a material having a lower thermal conductivity (e.g., stainless steel).

FIGS. 3A-3H depict two exemplary working chambers in various positions. As depicted in FIGS. 3A-3H, the plenum layers that facilitate the flow of fluid into respective slots 249a are hidden.

As depicted in FIGS. 3A, 3C, 3E, and 3G, first mover 230a and first mover 230b may be phase shifted from each other by 90 degrees. A phase shift may refer to a difference in position between two periodic motions of the same frequency. For example, a 90 degree phase shift between first mover 230a and first mover 230b may be represented one mover positioned against a recess (e.g., first mover 230a against recess 231a) while the other mover is positioned between recesses (e.g., first mover 230b between recesses 231b and 233b). When shaft 102 is rotated 90 degrees, first mover 230a may be positioned between recesses 231a and 233a while first mover 230b is positioned against recess 233b. Thus, with each 90 degree turn of shaft 102, one mover is positioned against a recess and the other mover is positioned between the recesses.

In this manner, FIGS. 3A, 3C, 3E, and 3G depict the four extreme positions of movers 230a and 232a based on a rotation of shaft 102. In an example operation, the movement of movers 230a and 232a of Stirling device 100 may be configured to assist a flow of working fluid through heat exchanger flow paths between working chambers 106 and 108 and through coolant portions 110 and 112 and regenerator portion 114. In a similar manner, FIGS. 3B, 3D, 3F, and 3H depict the four extreme positions of movers 230b and 232b based on a rotation of shaft 102. In an example operation, the movement of movers 230b and 232b of Stirling device 100 may be configured to assist a flow of working fluid through heat exchanger flow paths between working chambers 108 and 106 and through coolant portions 112 and 110 and regenerator portion 114.

For example, as motor 104 drives (e.g., rotates) shaft 102, first mover 230a and second mover 232a are moved (e.g., back and forth in a repetitive linear motion between respective recesses). The linear movement of first mover 230a and second mover 232a back and forth against the respective recesses of housing 236a may facilitate a movement of working fluid into and out of first working chamber 106 via slots 249a by creating a pressure differential in first working chamber 106. For example, a mover entering a recess and contacting the housing may push a working fluid through slots 249a (e.g., near the recess). Further, a mover leaving a recess and no longer contacting the housing may pull a working fluid through slots 249a (e.g., via a respective opening in plenum layer 240a).

Figure 3A:
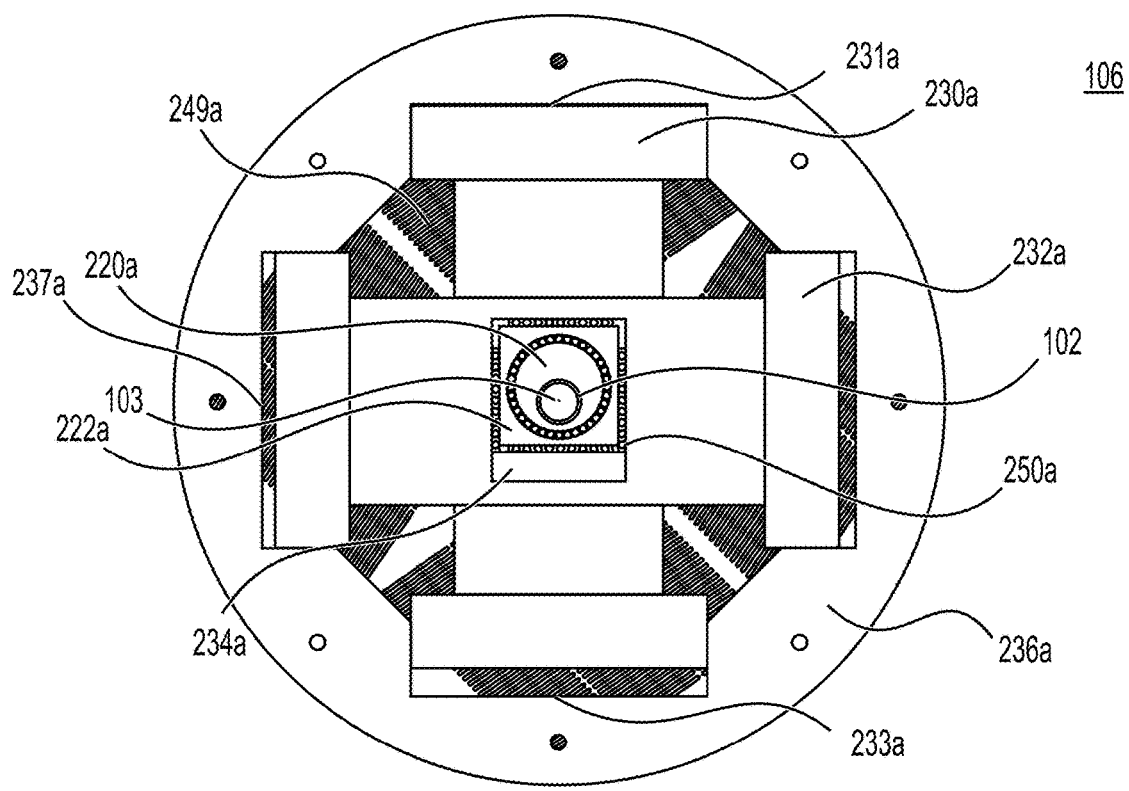
FIG. 3A illustrates one example working chamber of the heat pump depicted in FIG. 1 in a first position, consistent with disclosed embodiments.
Figure 3B:
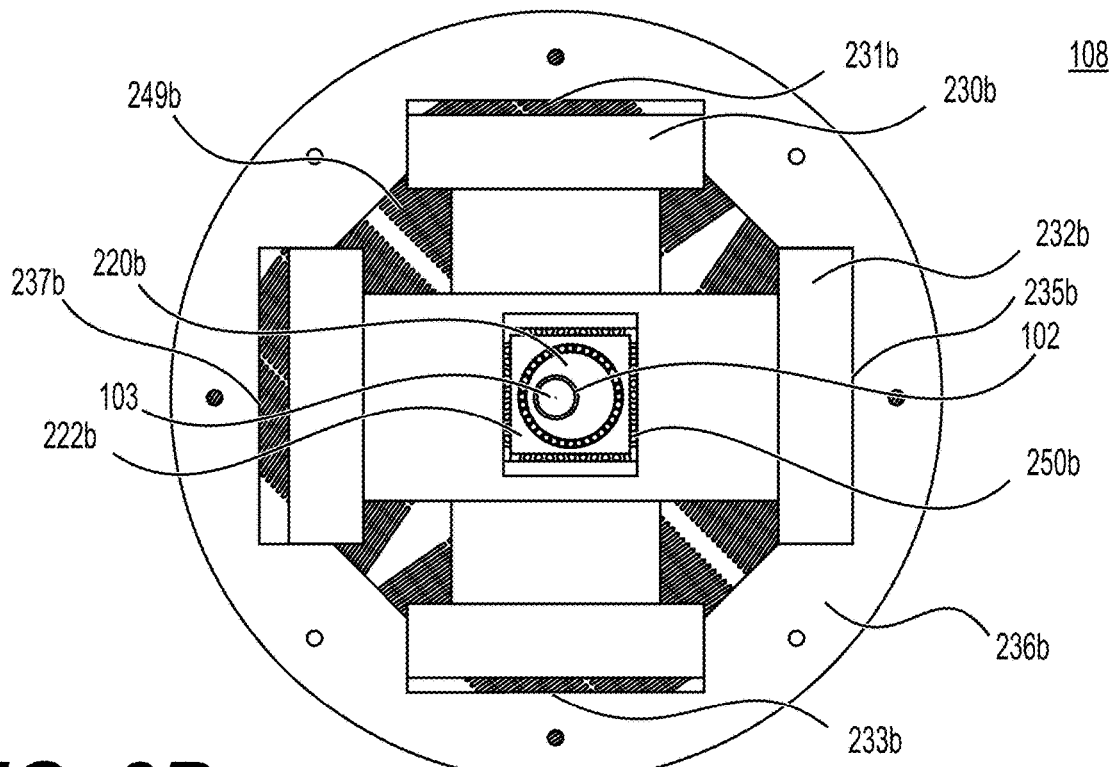
FIG. 3B illustrates another example working chamber of the heat pump depicted in FIG. 1 in a first position, consistent with disclosed embodiments.

FIG. 3A illustrates first working chamber 106 of Stirling device 100 depicted in FIG. 1 in a first position, consistent with disclosed embodiments. A first position may refer to a first orientation of shaft 102 equal to 0 or 360 degrees of rotation from a starting position and the corresponding positions of all coupled movers. For example, in the first position, first mover 230a may be fully moved or extended into recess 231a and second mover 232a may be in between recesses 235a and 237a. Further, in the first position, first working chamber 106 may take in a working fluid via slots 249a near recesses 233a and 237a (e.g., through openings 243a and 247a of plenum layer 240a) and may expel a working fluid via slots 249a near recesses 231a and 235a (e.g., through openings 241a and 245a of plenum layer 240a). In some embodiments, there may be any number and/or arrangement of slots 249a. In some embodiments, slots 249a may be configured to receive a heat exchanger. For example, a heat exchanger may be inserted into a slot 249a to provide a thermally conductive flow path for a working fluid. FIG. 3B illustrates second working chamber 108 of Stirling device 100 depicted in FIG. 1 in the first position, consistent with disclosed embodiments.

Figure 3C:
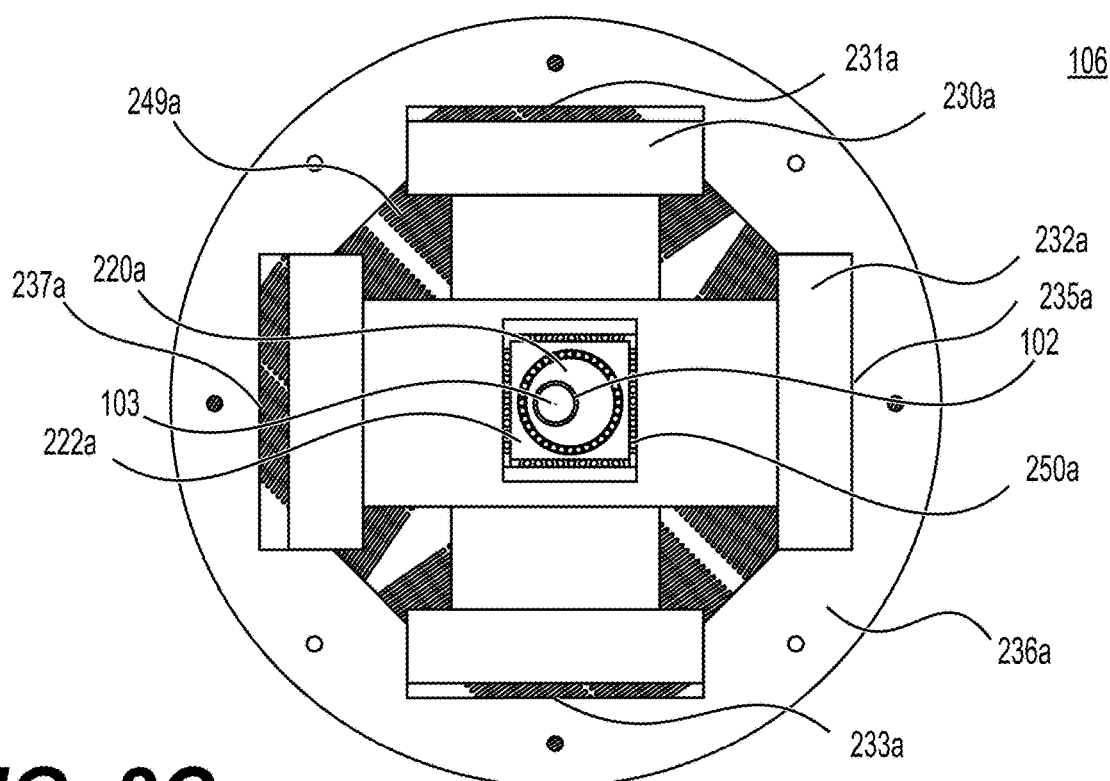
FIGS. 3C and 3D illustrate two example working chambers of the heat pump depicted in FIG. 1 in a second position, consistent with disclosed embodiments.
Figure 3D:
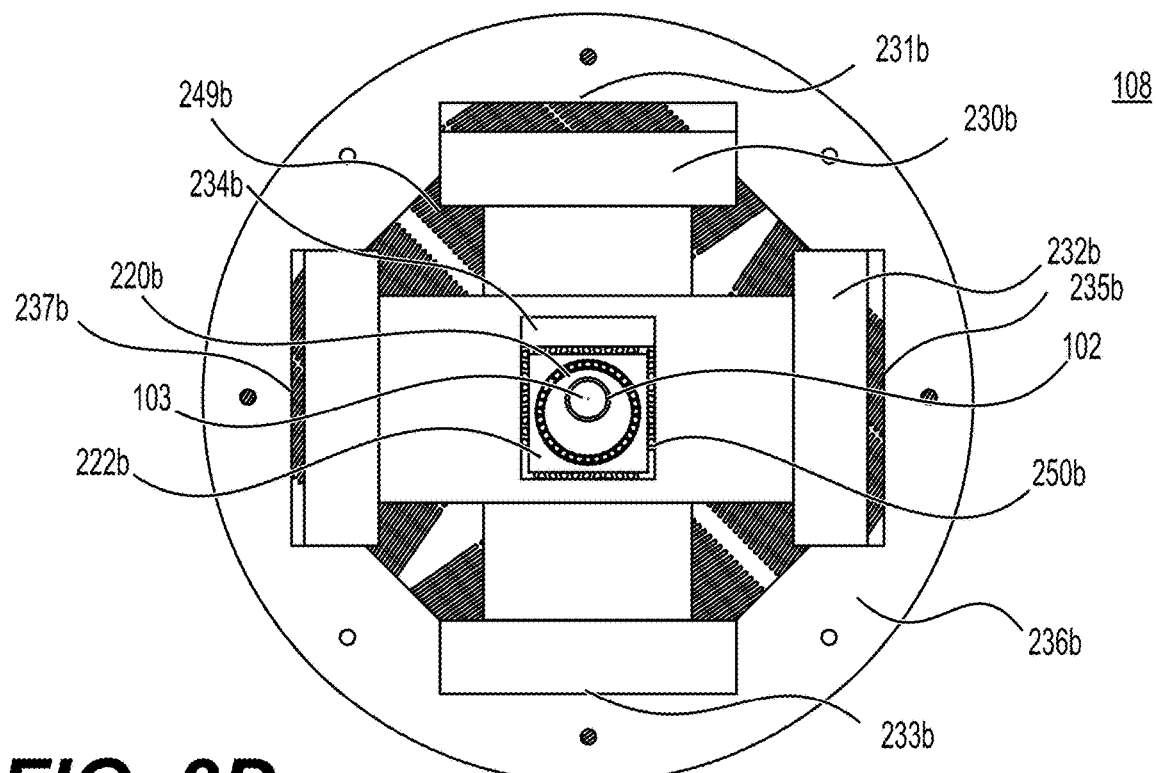

FIG. 3C illustrates first working chamber 106 depicted in FIG. 3A in a second position, consistent with disclosed embodiments. A second position may refer to a second orientation of shaft 102 equal to 90 degrees of rotation from the starting position and the corresponding positions of all coupled movers. For example, in the second position, second mover 232a may be fully moved or extended into recess 235a and first mover 230a may be in between recesses 231a and 233a. Further, in the second position, first working chamber 106 may take in a working fluid via slots 249a near recesses 231a and 237a (e.g., through openings 241a and 247a of plenum layer 240a) and may expel a working fluid via slots 249a near recesses 233a and 235a (e.g., through openings 243a and 245a of plenum layer 240a). FIG. 3D illustrates second working chamber 108 of Stirling device 100 depicted in FIG. 1 in the second position, consistent with disclosed embodiments.

Figure 3E:
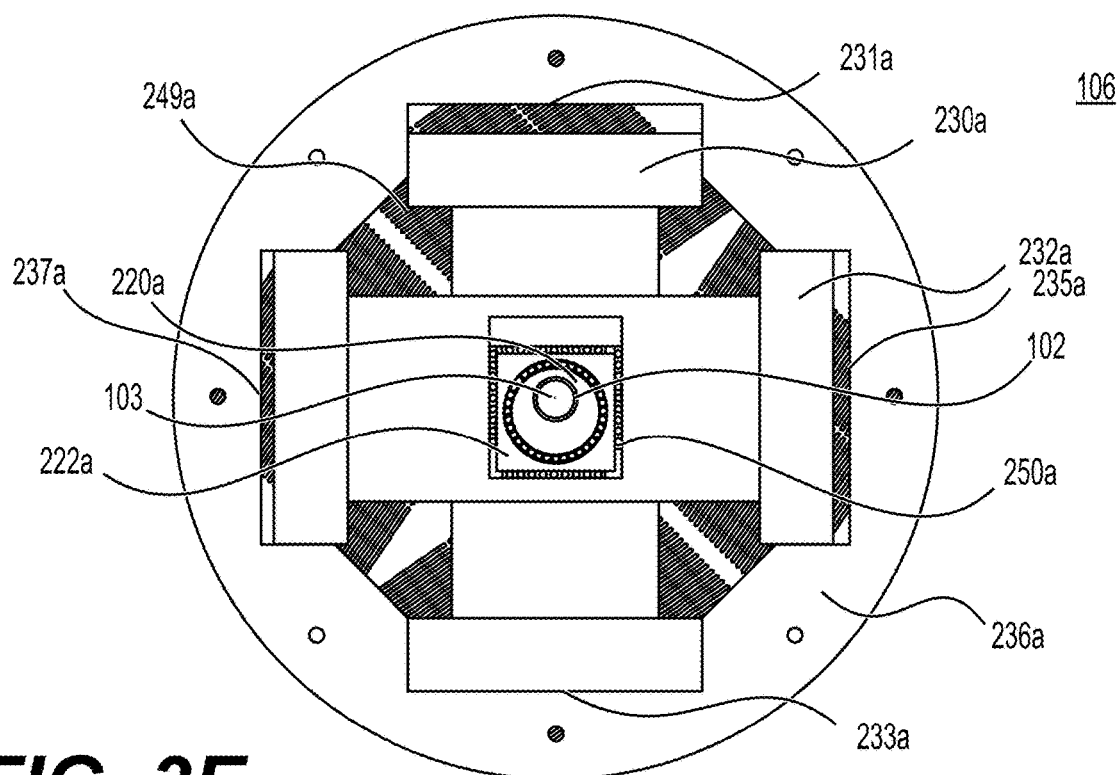
FIGS. 3E and 3F illustrate two example working chambers of the heat pump depicted in FIG. 1 in a third position, consistent with disclosed embodiments.
Figure 3F:
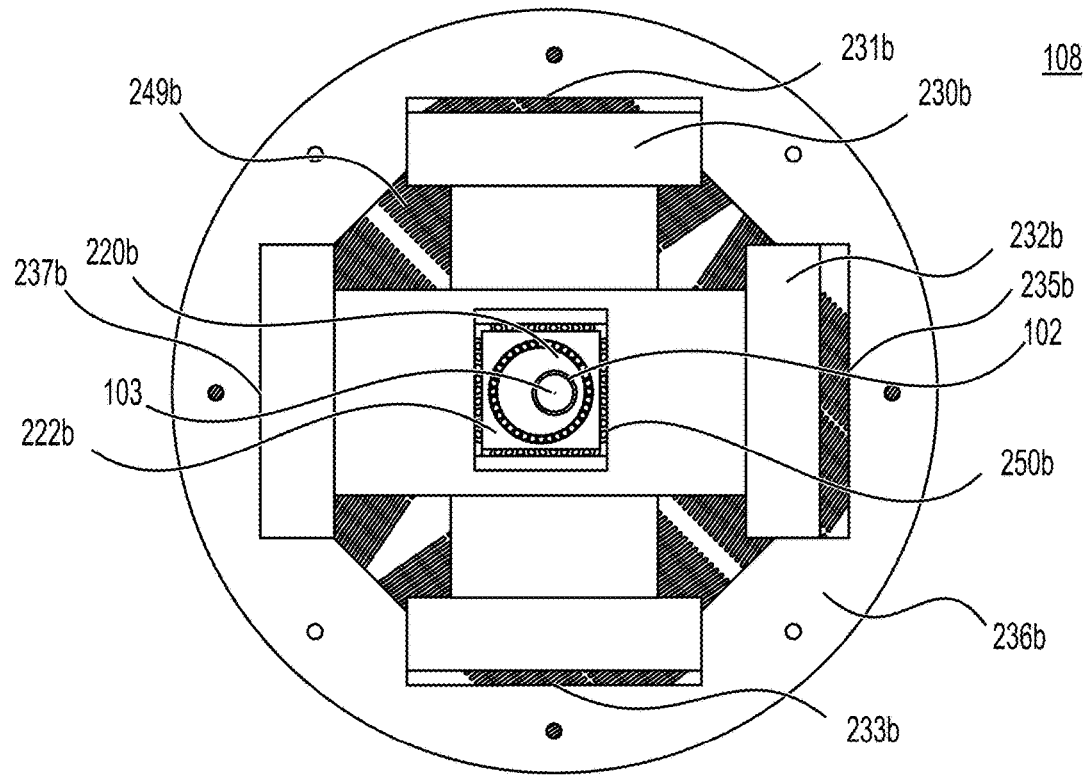

FIG. 3E illustrates first working chamber 106 depicted in FIG. 3A in a third position, consistent with disclosed embodiments. A third position may refer to a third orientation of shaft 102 equal to 180 degrees of rotation from the starting position and the corresponding positions of all coupled movers. For example, in the third position, first mover 230a may be fully moved or extended into recess 233a and second mover 232a may be in between recesses 235a and 237a. Further, in the third position, first working chamber 106 may take in a working fluid via slots 249a near recesses 231a and 235a (e.g., through openings 241a and 245a of plenum layer 240a) and may expel a working fluid via slots 249a near recesses 233a and 237a (e.g., through openings 243a and 247a of plenum layer 240a). FIG. 3F illustrates second working chamber 108 of Stirling device 100 depicted in FIG. 1 in the third position, consistent with disclosed embodiments.

Figure 3G:
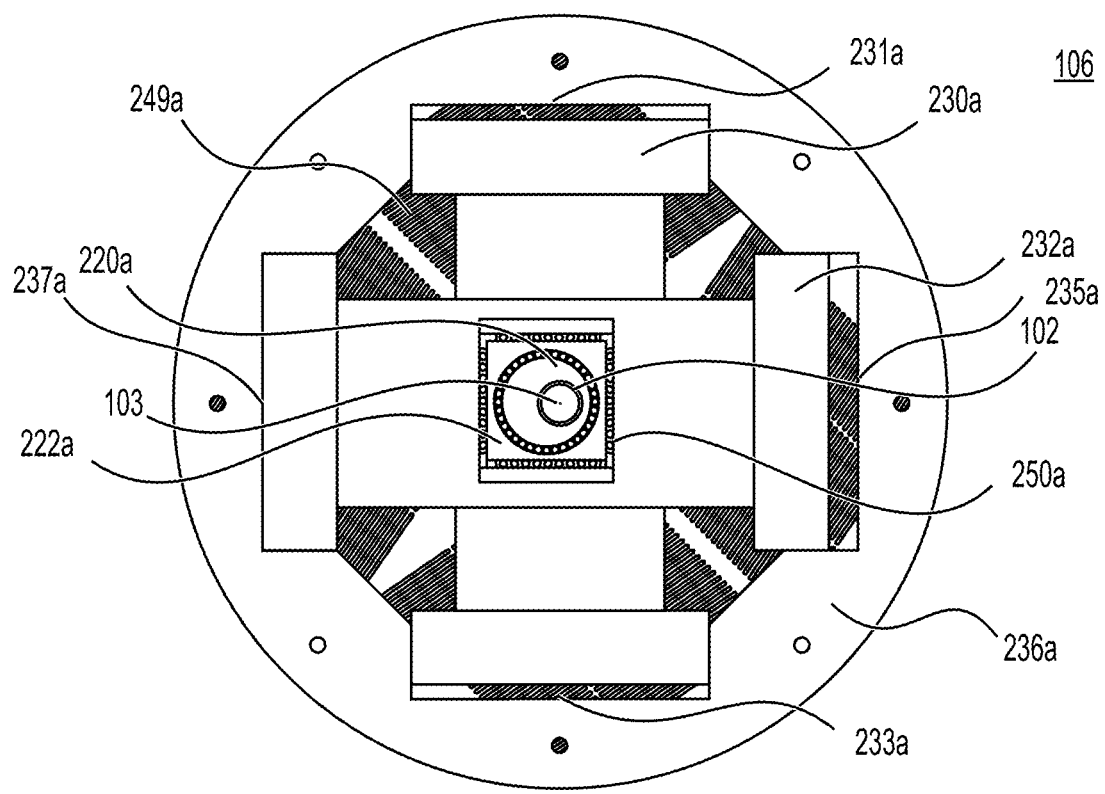
FIGS. 3G and 3H illustrate two example working chambers of the heat pump depicted in FIG. 1 in a fourth position, consistent with disclosed embodiments.
Figure 3H:
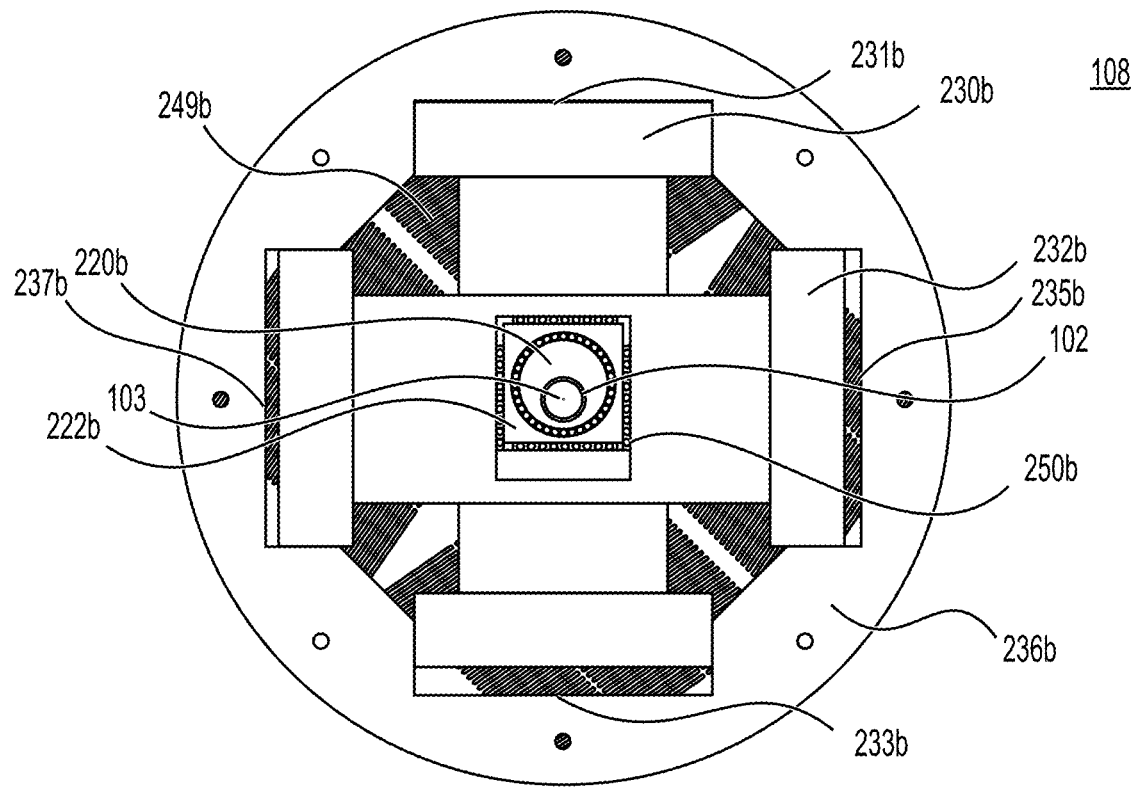

FIG. 3G illustrates first working chamber 106 depicted in FIG. 3A in a fourth position, consistent with disclosed embodiments. A fourth position may refer to a fourth orientation of shaft 102 equal to 270 degrees of rotation from the starting position and the corresponding positions of all coupled movers. For example, in the fourth position, second mover 232a may be fully moved or extended into recess 237a and first mover 230a may be in between recesses 231a and 233a. Further, in the fourth position, first working chamber 106 may take in a working fluid via slots 249a near recesses 233a and 235a (e.g., through openings 243a and 245a of plenum layer 240a) and may expel a working fluid via slots 249a near recesses 231a and 237a (e.g., through openings 241a and 247a of plenum layer 240a). FIG. 3H illustrates second working chamber 108 of Stirling device 100 depicted in FIG. 1 in the fourth position, consistent with disclosed embodiments.

In some embodiments, a mover of a first working chamber may be phase-shifted compared to a corresponding mover of a second working chamber. For example, first mover 230a of first working chamber 106 may be phase-shifted compared to first mover 230b of second working chamber 108. In some embodiments, a mover of first working chamber may be phase-shifted by 90 degrees compared to a corresponding mover of a second working chamber. For example, as depicted in FIGS. 3A-3H, first mover 230a of first working chamber 106 may be phase-shifted by 90 degrees compared to first mover 230b of second working chamber 108. Similarly, second mover 232a of first working chamber 106 may be phase-shifted by 90 degrees compared to second mover 232b of second working chamber 108. In another example, first mover 230a may be phase-shifted relative to first mover 230b by 132 degrees.

Figure 4:
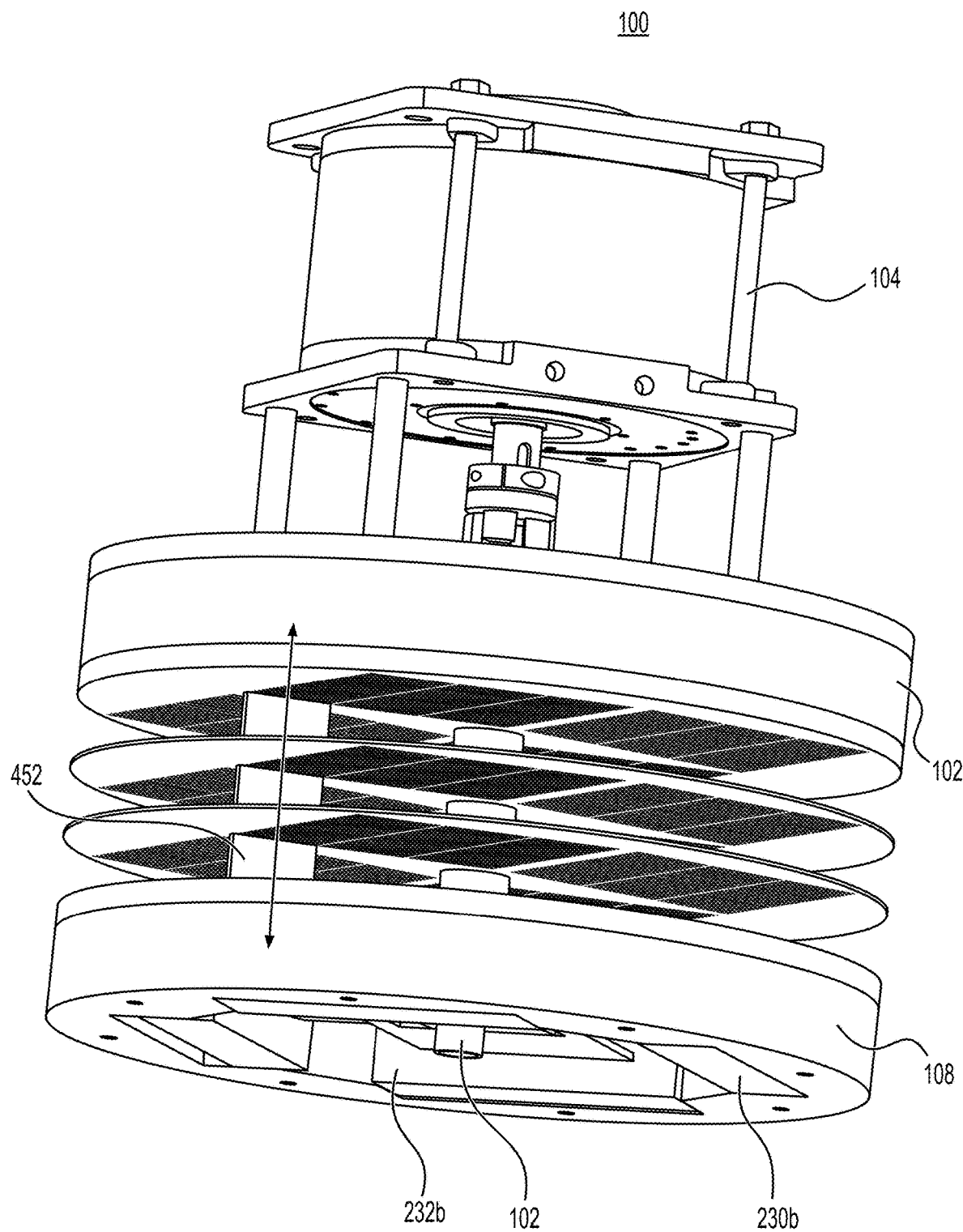
FIG. 4 illustrates an example flow within the heat pump, consistent with disclosed embodiments.

FIG. 4 illustrates an example flow within Stirling device 100, consistent with disclosed embodiments. As depicted in FIG. 4, cover plate 109 of second working chamber 108 is hidden to expose first mover 230b, second mover 232b, and shaft 102. Further, as depicted in FIG. 4, first coolant portion 110, second coolant portion 112, and regenerator portion 114 are hidden to expose an example flow path from first working chamber 106 to second working chamber 108.

In some embodiments, Stirling device 100 may include one or more heat exchangers 452. A heat exchanger may refer to a device or component configured to facilitate a transfer of heat between a first element and a second element, typically without mixing the two elements. For example, a heat exchanger may facilitate a transfer of heat from a hot fluid (e.g., liquid, gas) to a heat storage medium or from a heat storage medium to a cold fluid (e.g., liquid, gas).

In some embodiments, a heat exchanger may be configured to facilitate a flow of a fluid through the heat exchanger. For example, a heat exchanger may be hollow and have an opening on one end and an opening on another end such that a fluid (e.g., liquid, gas) may flow in from the one end out from the other end. By way of non-limiting example, heat exchanger 452 may be inserted into each slot 249, thereby fluidly connecting first working chamber 106 and second working chamber 108 by providing a flow path for a working fluid of a Stirling device to flow from first working chamber 106, through first coolant portion 110, regenerator portion 114, and second coolant portion 112 to second working chamber 108 and vice versa.

Thus, as a working fluid flows through a heat exchanger (e.g., as pushed, pulled, or otherwise moved due to the movement of a first mover and/or second mover of a working chamber), the heat exchanger may facilitate a transfer of heat from a hotter source to a colder sink. In one example, heat exchanger 452 may be configured to facilitate a transfer of heat from a hotter working fluid to a colder coolant in a coolant portion. Additionally, heat exchanger 452 may be configured to facilitate a transfer of heat from a hotter coolant to a colder working fluid in a coolant portion. In this way, a heat pump utilizing the Stirling cycle can take advantage of the Stirling cycle to efficiently heat or cool a coolant. Further, regenerator portion 114 may receive, store, and/or release heat energy between a heat exchange medium and a working fluid. This regenerative heat exchange process further increases the efficiency of Stirling device 100 by reducing or minimizing heat loss.

In some embodiments, a heat exchanger may comprise a higher thermally conductive material and/or a lower thermally conductive material. For example, heat exchanger 452 may comprise a higher thermally conductive material (e.g., copper, aluminum, or any other suitable material having a thermal conductivity of at least 100 W/(m·K)) in portions located in coolant portions 110 and 112 of Stirling device 100. Further, heat exchanger 452 may comprise a lower thermally conductive material (e.g., stainless steel, tungsten, polypropylene, or any other suitable material having a thermal conductivity less than 100 W/(m·K)) in a portion located in regenerator portion 114 of Stirling device 100. In this way, heat exchanger 452 is configured to facilitate a greater transfer of heat between a working fluid and a coolant flowing through a coolant portion compared to a transfer of heat between the working fluid and a heat exchange medium of a regenerator portion.

Although FIG. 4 only depicts a single heat exchanger 452, it may be understood that any number of heat exchangers (e.g., equal to a number of slots 249a and/or 249b) may be used. Further, FIG. 4 depicts a bidirectional arrow indicating flow direction between second working chamber 108 to first working chamber 106 through heat exchanger 452; it may be understood that working fluid may flow in either direction at a given time during operation and may change its direction at different phase of an operation cycle. Additionally, the direction of flow may be based on a movement of movers in working chambers or a phase of an associated Stirling cycle.

In some embodiments, a shaft may extend from a first working chamber to a second working chamber. For example, a shaft may extend from a connected motor, through a first working chamber to a second working chamber. By way of non-limiting example, shaft 102 may extend from motor 104, through first working chamber 106, first coolant portion 110, regenerator portion 114, and second coolant portion 112 to second working chamber 108.

Figure 5:
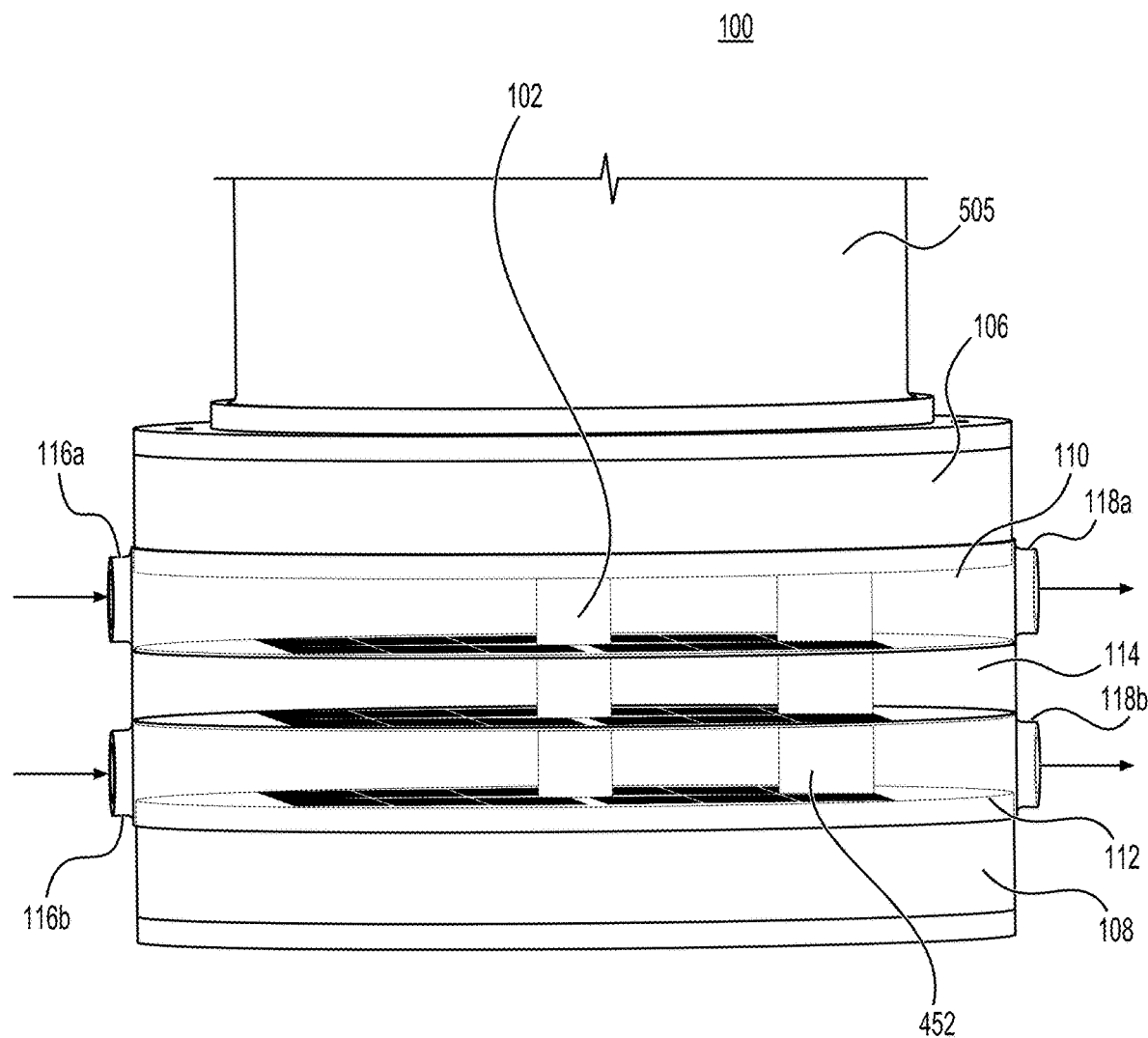
FIG. 5 illustrates an example flow through the heat pump, consistent with disclosed embodiments.

FIG. 5 illustrates an example flow through Stirling device 100, consistent with disclosed embodiments. As depicted in FIG. 5, first coolant portion 110, second coolant portion 112, and regenerator portion 114 are made transparent to expose an example flow path through the coolant portions.

In some embodiments, Stirling device 100 may include a cover. For example, a cover may be a component configured to house, to encase, to enclose, or to protect one or more components from an external environment. By way of non-limiting example, Stirling device 100 may include a cover 505 configured to house or to enclose motor 104.

In some embodiments, a first coolant portion may be configured to receive coolant at a first temperature and a second coolant portion is configured to receive the coolant at a second temperature lower than the first temperature. For example, a first coolant portion may be configured to receive coolant via an inlet port having a temperature greater than a working fluid. In some embodiments, the working fluid, via a heat exchanger, may absorb or receive heat from the coolant, thereby cooling the coolant. Further, a second coolant portion may be configured to receive a coolant via an inlet port having a temperature lower than a working fluid and/or coolant flowing through a first coolant portion. In some embodiments, the working fluid, via a heat exchanger, may release or transfer heat to the coolant, thereby heating the coolant. By way of non-limiting example, first coolant portion 110 may receive, via inlet port 116a, a coolant having a hotter temperature relative to a working fluid flowing through first coolant portion 110 via heat exchanger 452. First coolant portion may then expel or discharge, via outlet port 118a, the coolant after it has been cooled (e.g., by having heat transferred to the working fluid). Further, second coolant portion 112 may receive, via inlet port 116b, a coolant having a colder temperature relative to a working fluid flowing through second coolant portion 112 via heat exchanger 452. Second coolant may then expel or discharge, via outlet port 118b, the coolant after it has been heated (e.g., by having heat transferred from the working fluid).

Although FIG. 5 only depicts a flow direction from an inlet port through a coolant portion to an outlet port, coolant may flow in either direction. Additionally, the direction of flow of the coolant may be based on, for example, an external pump. Further, although FIG. 5 only depicts a single heat exchanger 452, it may be understood that any number of heat exchangers (e.g., equal to a number of slots 249a and/or 249b) may be used.

Figure 6A:
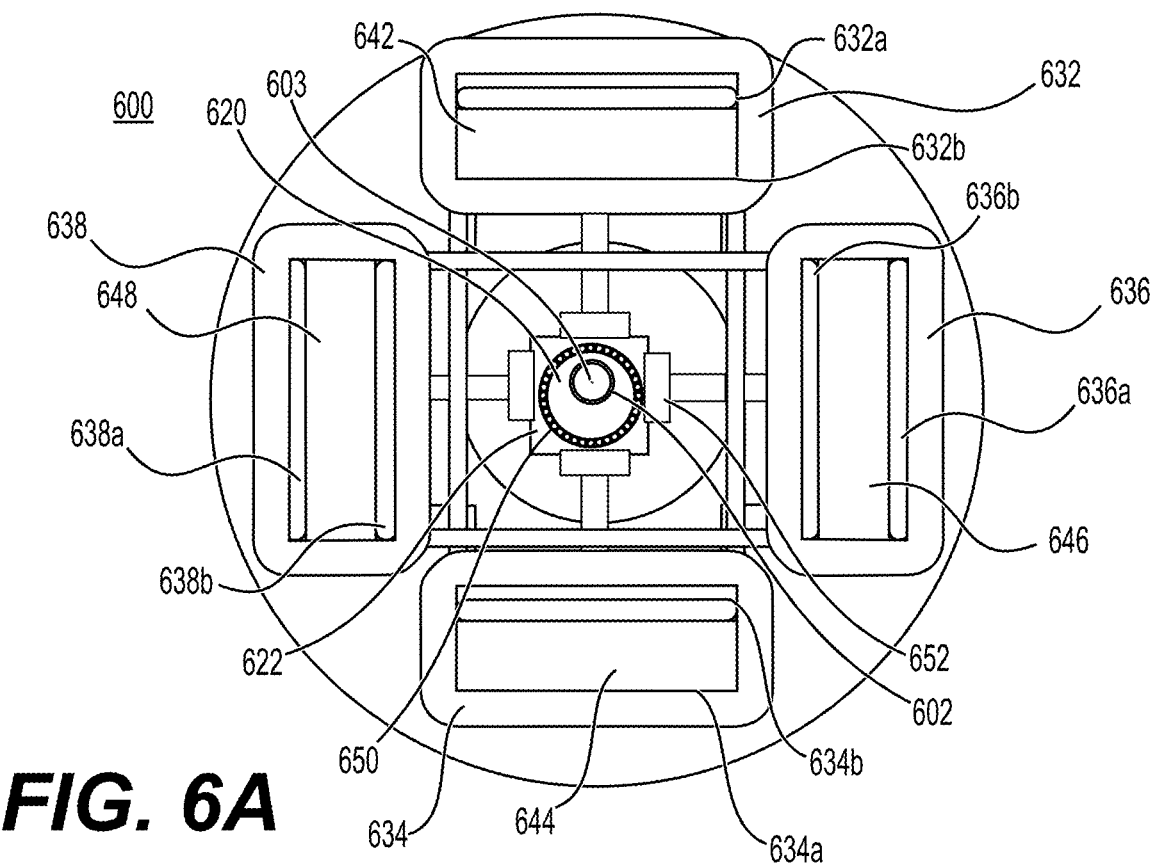
FIG. 6A illustrates a plan view of another example working chamber, consistent with disclosed embodiments.
Figure 6B:
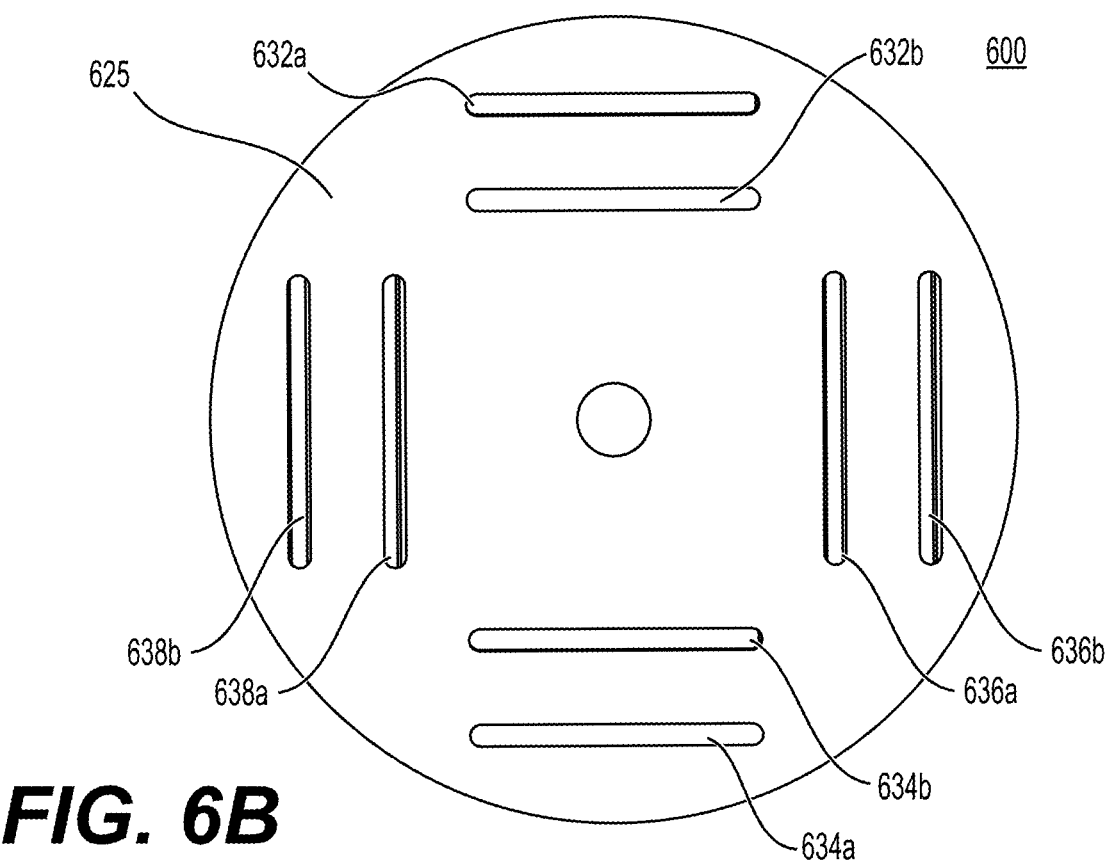
FIG. 6B illustrates a bottom view of the working chamber depicted in FIG. 6A, consistent with disclosed embodiments.

FIG. 6A illustrates a top plan view of a working chamber 600, and FIG. 6B illustrates a bottom plan view of working chamber 600, consistent with disclosed embodiments. Working chamber 600 may include a shaft 602 centered about axis 603; a rotor 620; a slider 622; a first mover with a first end 632 and a second end 634; a first stator 642; a second stator 644; a second mover with a third end 636 and a fourth end 638; a third stator 646; a fourth stator 648; a layer 625 with openings 632a, 632b, 634a, 634b, 636a, 636b, 638a, and 638b; couplings 650; and couplings 652. Shaft 602, rotor 620, slider 622, and couplings 650 may function similarly as described above with respect to similar components of working chambers 106 and 108. As shaft 602 rotates (e.g., as rotated by a motor), rotor 620 rotates and moves slider 622. Couplings 652 may be configured to receive slider 622 and, based on a movement of slider 622, push a mover in a same direction. For example, couplings 652 may be a linear bearing, linear guide, or linear rail.

In some embodiments, an end of a mover may be hollow and contain a stator. For example, first end 632 may be hollow and contain first stator 642. In some embodiments, a first space 632a may be defined by first stator 642 and one interior side of first end 632, and a second space 632b may be defined by first stator 642 and another interior side of first end 632. Further, as the first mover is moved back and forth repetitively (e.g., due to rotation of shaft 102), an interior side of first end 632 and first stator 642 may form a piston-cylinder assembly configured to move (e.g., push, pull) fluid into and out through an opening (e.g., opening 632a and 632b). Similarly, second end 634 may contain second stator 644 and may form another two piston-cylinder assemblies configured to move fluid into and out of openings 634a and 634b. Additionally, third end 636 may contain third stator 646 and may form another two piston-cylinder assemblies configured to move fluid into and out of openings 636a and 636b. Moreover, fourth end 638 may contain fourth stator 648 and may form another two piston-cylinder assemblies configured to move fluid into and out of openings 638a and 638b. Thus, as depicted in FIG. 6A, working chamber 600 may include eight total piston-cylinder assemblies across two axes of linear motion.

In some embodiments, Stirling device 100 may include two working chambers 600 instead of first working chamber 106 and second working chamber 108. Further, the openings in layer 625 may correspond to one or more slots (e.g., slots 249). In some embodiments, each piston-cylinder assembly in one working chamber 600 may be fluidly connected to a corresponding piston-cylinder assembly in the other working chamber 600, thereby creating eight total volumes, each of which may operate on a Stirling cycle.

Figure 7:
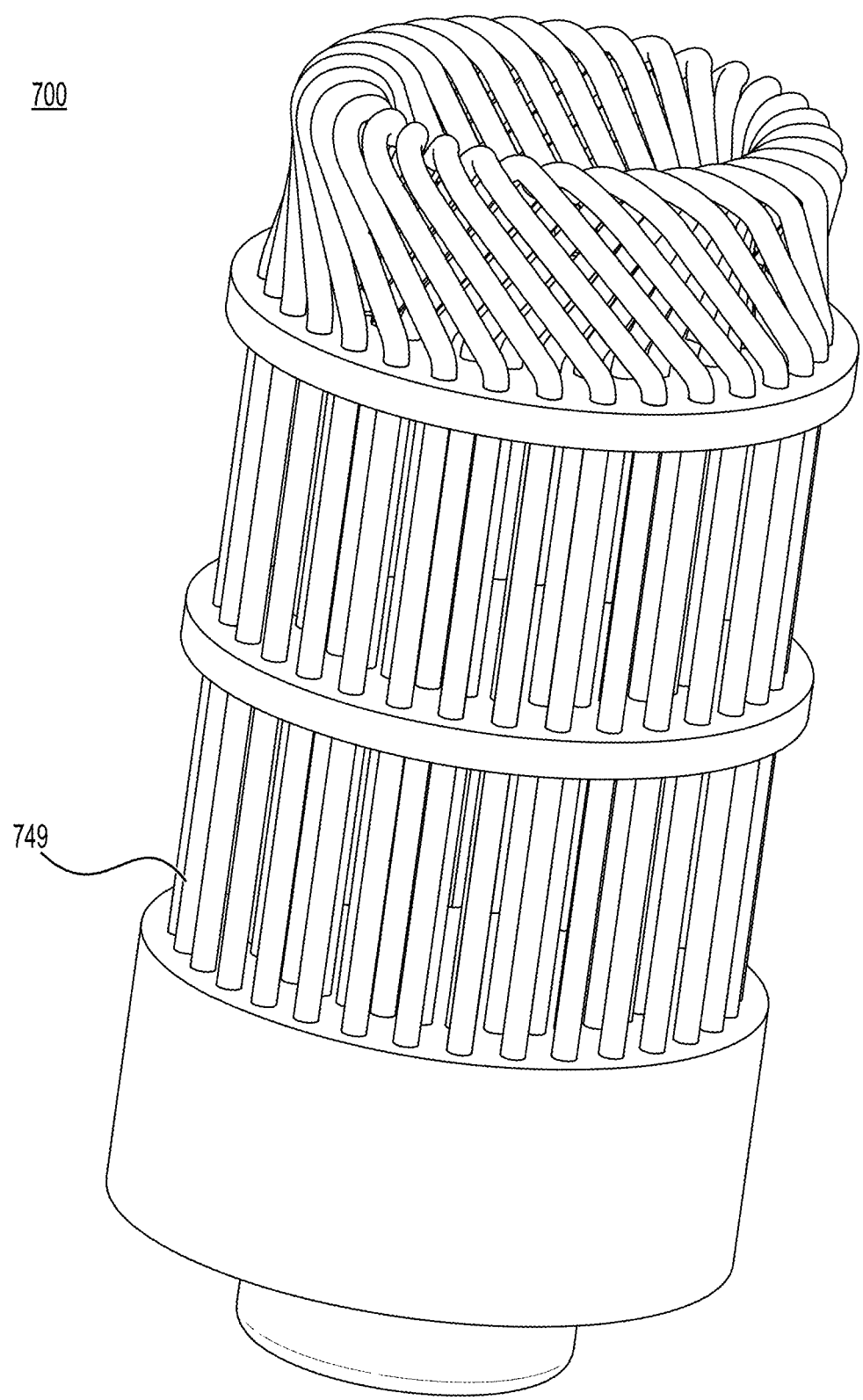
FIG. 7 illustrates an example flow return variant of the working chamber, consistent with disclosed embodiments.

FIG. 7 illustrates a flow return variant of working chamber 700, consistent with disclosed embodiments. Flow return variant 700 may include a plurality of tubes 749. Tubes 749 may replace slots 249 and may facilitate a flow of fluid (e.g., gas, liquid) from one end to another end and vice versa. For example and with reference to working chamber 106, each tube 749 may fluidly connect one piston-cylinder assembly (e.g., first mover 230a and recess 231a) to another phase-shifted piston-cylinder assembly (e.g., second mover 232a and recess 235a). In some embodiments, a single working chamber 106 and flow return variant 700 may form two volumes, each of which may contain a Stirling cycle. In some embodiments, flow return variant 700 may replace second working chamber 108. In some embodiments, flow return variant 700 may replace first working chamber 106.

Figure 8:
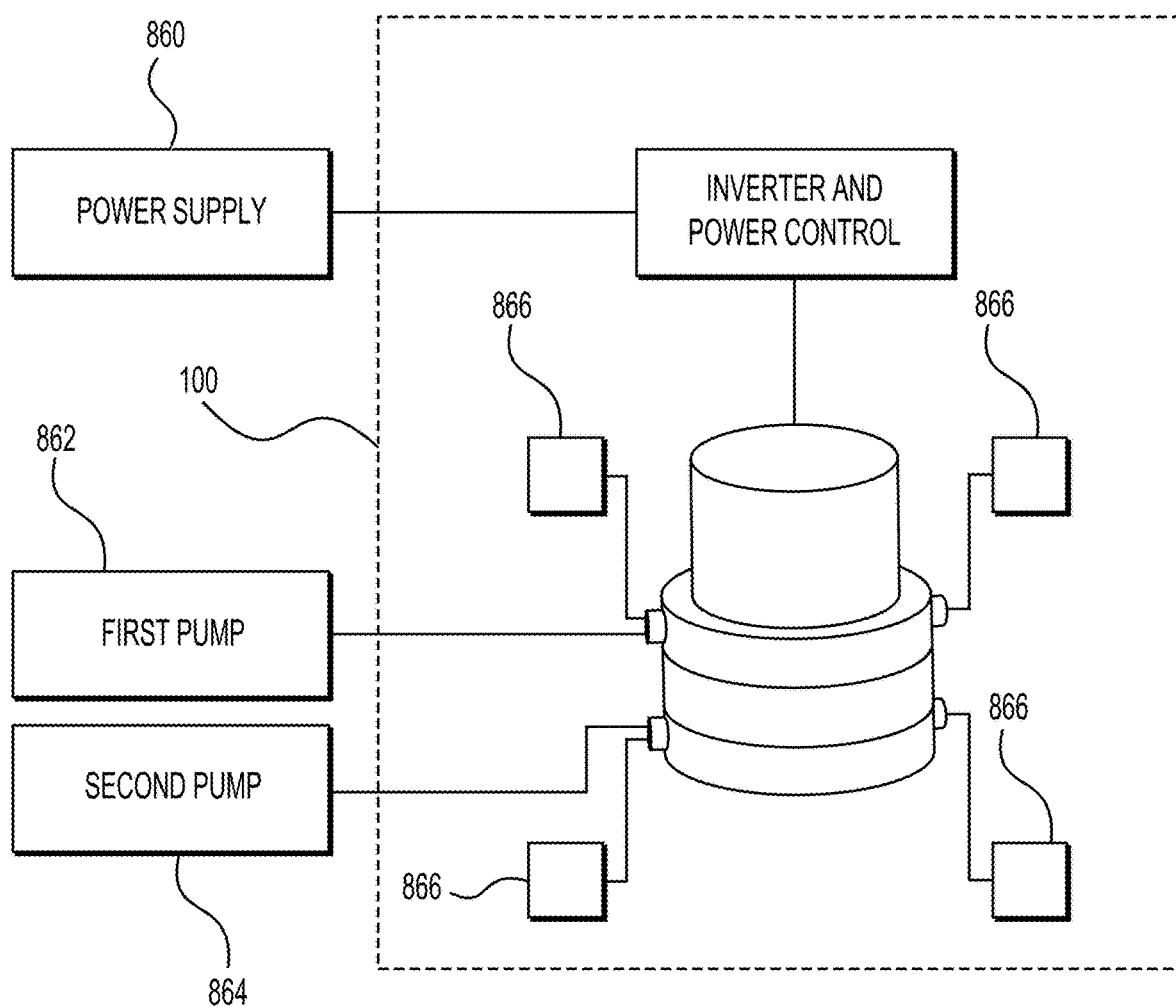
FIG. 8 illustrates an example system using the heat pump, consistent with disclosed embodiments.

FIG. 8 illustrates an example system 800 using Stirling device 100, consistent with disclosed embodiments. For example, system 800 may be a Heating, Ventilation, and Air Conditioning (HVAC) system and may be configured to provide heat and/or cold air to a building, structure, or environment.

For example, system 800 may include a power supply 860, a Stirling device 100, a first pump system 862, a second pump system 864, and a tracking processor 866. Power supply 860 may be any power source, including from an electric grid, a power line, a generator, or any other power source. Power supply 860 may power Stirling device 100. For example, power supply 860 may provide electrical power to an inverter and power controls configured to power and control Stirling device 100.

In one example, first pump system 862 may be configured to pump a hot coolant into first coolant portion 110 of Stirling device 100. Further, second pump system 864 may be configured to pump a cold coolant into second coolant portion 112 of Stirling device 100. In another example, first pump system 862 may be configured to pump a cold coolant into first coolant portion 110 of Stirling device 100. Further, second pump system 864 may be configured to pump a hot coolant into second coolant portion 112 of Stirling device 100.

In some embodiments, a tracking processor may be configured to track properties associated with Stirling device 100. For example, a tracking processor may be configured to measure a temperature at an inlet port and/or an outlet port of Stirling device 100. In one example, tracking processor 866 may be in communication with (e.g., via wire, wirelessly, via a shared network) one or more sensors located in, on, or near inlet port 116a, inlet port 116b, outlet port 118a, and/or outlet port 118b of Stirling device 100. Further, tracking processor 866 may be configured to store received measurements from the one or more sensors in a memory (e.g., local hard drive, transmit to a database). In this way, information regarding the operation or operating conditions of Stirling device 100 may be used to, for example, adjust an operation of or detect a potential failure in Stirling device 100. Information regarding the operation or operating conditions may include a temperature at inlet port 116a and 116b, a temperature at outlet port 118a and 118b, a speed of motor 104 (e.g., rotations per minute or "RPM"), an internal pressure of the working fluid within Stirling device 100, power consumption of Stirling device 100, or any other suitable data regarding the operation of Stirling device 100. Tracking processor 866 (e.g., local to Stirling device 100, remote to Stirling device 100) may output a command to adjust an operation of Stirling device 100. For example, if a temperature at outlet port 118a is not greater than a predetermined threshold, tracking processor 866 may command Stirling device 100 to increase or decrease an RPM of motor 104 so that the temperature at outlet port 118*a* is within an acceptable range. The range or threshold may be stored in a memory of tracking processor 866.

In another example, Stirling device 100 may be included in a system as a Stirling engine. For example, Stirling device 100 may be configured to utilize the Stirling cycle with a heat source and a heat sink (e.g., hot coolant and cold coolant, fire and ambient air) to move and cycle an internal working fluid, whose temperature changes may induce pressure changes that move first movers 230*a* and 230*b* and second movers 232*a* and 232*b* such that shaft 102 rotates. The rotation of shaft 102, powered by the Stirling cycle, may be used to, for example, rotate a wheel of a vehicle, a gear, a cog, a fan blade, or any other suitable application. In some embodiments, coolant portions 110 and 112 may be modified or replaced based on a heat source and a heat sink to facilitate a transfer of heat. By way of non-limiting example, when the heat source is a fire (e.g., fuel burning, geothermal heat), coolant portion 110 may comprise a thermally conductive material to facilitate a transfer of heat from the fire to a colder working fluid (e.g., copper heat exchanger with fins). Further, when the heat sink is ambient air, coolant portion 112 may comprise a thermally conductive material to facilitate a transfer of heat from hotter working fluid to the ambient air or environment (e.g., via fins, fans, blowers).

In yet another example, Stirling device 100 may be included in a system as a Stirling generator. In some embodiments, Stirling device 100 may be configured to utilize the Stirling cycle with a heat source and a heat sink (e.g., hot coolant and cold coolant, fire and ambient air) to move and cycle an internal working fluid, whose temperature changes may induce pressure changes that move first movers 230*a* and 230*b* and second movers 232*a* and 232*b* such that shaft 102 rotates. Shaft 102 may include magnets and may be positioned within one or more windings or coils. In some embodiments, when shaft 102 rotates, the rotating magnets induce an electrical current in the windings or coils, which may be transferred to an electrical appliance (e.g., refrigerator, vehicle, computer) or electrical storage device (e.g., battery).

In yet another example, a modified Stirling device 100 may be included in a system as a fluid pump or compressor. In some embodiments, modified Stirling device 100 may not include first coolant portion 110, second coolant portion 112, and regenerator portion 114. Further, first working chamber 106 may be configured to accept a flow of fluid, and first mover 230*a* and second mover 232*a* may facilitate a flow of fluid (e.g., gas, liquid) in a single direction (e.g., using one-way valves) to second working chamber 108. In some embodiments, a mover may be configured to facilitate a flow of fluid into second working chamber 108, in which its pressure may increase. Then second working chamber 108 may release the higher pressure fluid (e.g., after the pressure surpasses a predetermined threshold). Moreover, modified Stirling device 100 may include any number of working chambers fluidly connected in series (e.g., using one-way valves) to form a multi-stage pump or compressor. By way of non-limiting example, modified Stirling device 100 may be used to circulate fluid (e.g., gas at cryogenic temperatures for superconducting magnets), as a compressor (e.g., multi-stage compressor), as a pump (e.g., for the first stage of a Joule-Thompson cooler), or any other suitable application as appreciated by those skilled in the art.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. These terms are used to distinguish one element from another. For example, a first element could be termed a second element, and, similarly, a second element could be termed a first element, without departing from the scope of the embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the terms "and/or" and "or" encompass all possible combinations, except where infeasible. For example, if it is stated that a system may include A or B, then, unless specifically stated otherwise or infeasible, the system may include A, or B, or A and B. As a second example, if it is stated that a system may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A Stirling device, comprising:
   a shaft;
   a motor configured to rotate the shaft about an axis;
   a first working chamber and a second working chamber, each comprising:
      a rotor rotating about the axis, the rotor connected to the shaft and having a center offset from the axis;
      a slider coupled to the rotor;
      a first mover coupled to the slider and configured to move in a first direction perpendicular to the axis based on a movement of the slider; and
      a second mover coupled to the slider and configured to move in a second direction perpendicular to the axis and different from the second direction based on the movement of the slider;
   a first coolant portion and a second coolant portion, each located between the first working chamber and the second working chamber and comprising:
      an inlet port; and
      an outlet port; and
   a regenerator portion located between the first coolant portion and the second coolant portion.

2. The Stirling device of claim 1, wherein the first mover and the second mover each include one or more pistons configured to facilitate a flow of gas between the first working chamber and the second working chamber.

3. The Stirling device of claim 2, wherein the regenerator portion is configured to facilitate a transfer of heat between the gas and a heat exchange medium.

4. The Stirling device of claim 1, wherein:
   the first mover of the first working chamber is phase-shifted compared to the first mover of the second working chamber, and
   the second mover of the first working chamber is phase-shifted compared to the second mover of the second working chamber.

5. The Stirling device of claim 4, wherein the phase-shift is 132 degrees.

6. The Stirling device of claim 4, wherein the phase shift is adjustable.

7. The Stirling device of claim 4, wherein the phase shift is 90 degrees.

8. The Stirling device of claim 1, wherein rotating the shaft includes the motor driving the rotor.

9. The Stirling device of claim 1, wherein rotating the shaft includes the motor driving the shaft.

10. The Stirling device of claim 1, wherein:
   a first coolant portion is configured to receive a coolant at a first temperature, and
   a second coolant portion is configured to receive the coolant at a second temperature lower than the first temperature.

11. The Stirling device of claim 10, wherein the coolant is a gas or a liquid.

12. The Stirling device of claim 1, further comprising:
   at least one heat exchanger configured to facilitate a transfer of heat of a gas flowing between the first working chamber and the second working chamber and one or more of: a coolant associated with the first coolant portion, a heat exchange medium associated with the regenerator portion, and a coolant associated with the second coolant portion.

13. The Stirling device of claim 12, wherein the at least one heat exchanger extends from the first working chamber to the second working chamber.

14. The Stirling device of claim 1, wherein the shaft extends from the first working chamber to the second working chamber.

15. The Stirling device of claim 1, wherein a surface of the first mover and a surface of the second mover are uneven.

16. The Stirling device of claim 1, wherein one or more of a coupling between the slider and the rotor, a coupling between the slider and the first mover, and a coupling between the slider and the second mover, include intervening ball bearings.

17. The Stirling device of claim 16, wherein the ball bearings are lubricated.

18. The Stirling device of claim 1, wherein the first working chamber and the second working chamber are fluidly connected to each other.

19. The Stirling device of claim 1, wherein the first working chamber and the second working chamber each further comprise:
   a plenum layer configured to facilitate a flow of fluid into or out of a respective working chamber.

* * * * *